US011709873B2

(12) United States Patent
Xiao et al.

(10) Patent No.: US 11,709,873 B2
(45) Date of Patent: Jul. 25, 2023

(54) READER-RETRIEVER APPROACH FOR QUESTION ANSWERING

(71) Applicant: Adobe Inc., San Jose, CA (US)

(72) Inventors: Jinfeng Xiao, Urbana, IL (US); Lidan Wang, San Jose, CA (US); Franck Dernoncourt, Sunnyvale, CA (US); Trung Bui, San Jose, CA (US); Tong Sun, San Ramon, CA (US)

(73) Assignee: Adobe Inc., San Jose, CA (US)

( * ) Notice: Subject to any disclaimer, the term of this patent is extended or adjusted under 35 U.S.C. 154(b) by 420 days.

(21) Appl. No.: 16/741,625

(22) Filed: Jan. 13, 2020

(65) Prior Publication Data
US 2021/0216577 A1   Jul. 15, 2021

(51) Int. Cl.
*G06F 16/33*     (2019.01)
*G06F 16/953*    (2019.01)

(52) U.S. Cl.
CPC ........ *G06F 16/3347* (2019.01); *G06F 16/953* (2019.01)

(58) Field of Classification Search
CPC ............................ G06F 16/3347; G06F 16/953
USPC ........................................................ 707/780
See application file for complete search history.

(56) References Cited

U.S. PATENT DOCUMENTS

| 10,255,273 | B2* | 4/2019 | Chakraborty | ....... G06F 16/3344 |
| 2010/0191686 | A1* | 7/2010 | Wang | ..................... G06F 16/33 |
| | | | | 707/E17.014 |
| 2011/0125734 | A1* | 5/2011 | Duboue | .................... G09B 7/00 |
| | | | | 707/723 |
| 2013/0007033 | A1* | 1/2013 | Brown | ..................... G06N 5/02 |
| | | | | 707/768 |
| 2014/0280087 | A1* | 9/2014 | Isensee | ................. G06F 16/248 |
| | | | | 707/723 |
| 2015/0026163 | A1* | 1/2015 | Haggar | ............ G06F 16/24578 |
| | | | | 707/723 |
| 2016/0055234 | A1* | 2/2016 | Visotski | .............. G06F 16/3329 |
| | | | | 707/728 |
| 2017/0169717 | A1* | 6/2017 | Allen | ........................ G09B 7/08 |
| 2018/0373782 | A1* | 12/2018 | Liu | ......................... G06F 40/30 |

(Continued)

OTHER PUBLICATIONS

Shtok, Anna, et al., "Learning from the Past: Answering New Questions with Past Answers", WWW 2012, Lyon, France, Apr. 16-20, 2012, pp. 759-768.*

(Continued)

*Primary Examiner* — Robert Stevens
(74) *Attorney, Agent, or Firm* — NDWE LLP

(57) ABSTRACT

Techniques and systems are provided for predicting answers in response to one or more input queries. For instance, text from a corpus of text can be processed by a reader to generate one or multiple question and answer spaces. A question and answer space can include answerable questions and the answers associated with the questions (referred to as "question and answer pairs"). A query defining a question can be received (e.g., from a user input device) and processed by a retriever portion of the system. The retriever portion of the system can retrieve an answer to the question from the one or more pre-constructed question and answer spaces, and/or can determine an answer by comparing one or more answers retrieved from the one or more pre-constructed question and answer spaces to an answer generated by a retriever-reader system.

17 Claims, 8 Drawing Sheets

(56) References Cited

U.S. PATENT DOCUMENTS

| | | | | |
|---|---|---|---|---|
| 2019/0371299 | A1* | 12/2019 | Jiang | G10L 15/063 |
| 2020/0372025 | A1* | 11/2020 | Yoon | G06N 3/0454 |
| 2021/0064964 | A1* | 3/2021 | Katz | G06N 3/105 |

OTHER PUBLICATIONS

Jeon, Jiwoon, et al., "Finding Similar Questions in Large Question and Answer Archives", CIKM '05, Bremen, Germany, Oct. 31-Nov. 5, 2005, pp. 84-90.*

Shen, Yikang, et al., "Question/Answer Matching for CQA System via Combining Lexical and Sequential Information", Twenty-Ninth AAAI Conference on Artificial Intelligence, Austin, TX, Jan. 25-29, 2015, pp. 275-281.*

Bayardo, Roberto J., et al., "Scaling Up All Pairs Similarity Search", WWW 2007, Banff, Alberta, Canada, May 8-12, 2007, pp. 131-140.*

Cao, Xin, et al., "A Generalized Framework of Exploring Category Information for Question Retrieval in Community Question Answer Archives", WWW 2010, Raleigh, NC, Apr. 26-30, 2010, pp. 201-210.*

Krishna, Kalpesh, et al., "Generating Question-Answer Hierarchies", arXiv, Cornell University archive document No. arXiv:1906.02622v2 [cs.CL] Jul. 21, 2019, 15 pages.*

Tong, Peihao, et al., "Leveraging Domain Context for Question Answering Over Knowledge Graph", Data Science and Engineering, vol. 4, published online Nov. 4, 2019, pp. 323-335.*

Ye, Borui, et al., "Learning Question Similarity with Recurrent Neural Networks", ICBK 2017, Hefei, China, Aug. 9-10, 2017, IEEE Computer Society, pp. 111-118.*

Liu, Mengwen, et al., "Product review summarization through question retrieval and diversification", Inf. Retrieval J., vol. 20, Jul. 2017, pp. 575-605.*

Borthwick et al., "NYU: Description of the MENE Named Entity System as Used in MUC-7", Computer Science Department, New York University, Jan. 2002, 6 pages, (partially blank).

Cer et al., "Universal Sentence Encoder", arXiv preprint arXiv:1803.11175, 2018, 7 pages.

Devlin et al., "BERT: Pre-training of deep bidirectional transformers for language understanding", arXiv preprint arXiv:1810.04805, 2018, 16 pages.

Ferragina et al., "TAGME: On-the-fly Annotation of Short Text Fragments (by Wikipedia Entities)," In Proceedings of the 19th ACM International Conference on Information and Knowledge Management, Oct. 2010, pp. 1625-1628.

Krupka et al., "IsoQuest, Inc.: Description of the NetOwl(trademark) Extractor System as Used for MUC-7", Available Online at <https://aclanthology.org/M98-1015 pdf>, 1998, pp. 1-10.

Sun et al., "Ranking-Based Clustering of Heterogeneous Information Networks with Star Network Schema", in Proceedings of the 15th ACM SIGKDD International Conference on Knowledge Discovery and Data Mining, June 28-Jul. 1, 2009, 9 pages.

Yuan et al., "Machine Comprehension by Text-to-Text Neural Question Generation," Proceedings of the 2nd Workshop on Representation Learning for NLP, 2017, 14 pages.

Borthwick et al., "NYU: Description of the MENE Named Entity System as Used in MUC-7", Computer Science Department, New York University, Jan. 2002, 6 pages.

* cited by examiner

READER-RETRIEVER APPROACH FOR QUESTION ANSWERING

FIELD

This application is generally related to performing question answering based on input queries. For example, aspects of this application relate to performing a reader-retriever approach to question answering.

BACKGROUND

Question answering is a task of answering a given question based on a given sentence, passage, document, small document collection, and/or other text (e.g., a large corpus of text). Several methods and datasets have been developed for performing higher quality question answering tasks, including machine learning techniques, knowledge graph based techniques, among other techniques.

Question answering tasks can be categorized into two types, including standard question answering and open-domain question answering. In standard question answering tasks, it is known which portion of text (e.g., a particular sentence, passage, paragraph, or other portion) contains the answer to a given question. Open-domain question answering (referred to herein as OpenQA) aims to solve the task of automatically finding an answer to a given question from a large collection of documents and/or other text. While it is known which portion of the text includes the answer when performing standard question answering, such approximate answer location information is not available for OpenQA tasks.

Many solutions to OpenQA are based on a retriever-reader model. A retriever-reader model first uses a retriever to retrieve passages relevant to a question, and then uses a reader to read the retrieved passage and extract the answer. Retriever-reader models have been shown to achieve sub-optimal results for OpenQA tasks. For example, by adding a retriever before a reader to provide the reader with the portion of the text that conceivably has the correct answer, the OpenQA task is effectively converted to a standard question answering task, in which case existing standard question answering techniques can be applicable to OpenQA settings. However, retriever-reader models face a difficult efficiency-accuracy trade-off. For instance, the performance of the reader is limited to an upper bound of the retriever. When a retriever is designed to be computationally efficient, the results retrieved by the retriever will not be reliable (e.g., a retrieved portion of text may not contain a correct answer to a question), limiting the effect of the reader in analyzing the retrieved results. Computationally efficient retrievers can also lack trainable parameters for recovering from mistakes. On the other hand, to provide retrieved results that are more reliable, a retriever will need to be made highly complex to a point that the retriever will not be able to provide a timely result to the reader. For instance, a retriever that can provide reliable portions of text for a reader to process may take several seconds to output the results to the reader, which is an unacceptably large delay for an end user experience.

Techniques and systems are needed for providing a high-accuracy question answering solution that can be used for standard question answering and/or for OpenQA.

SUMMARY

Question answering systems and related techniques are described herein that perform question answering (e.g., OpenQA) using a reader-retriever approach. For instance, text and/or other information from a corpus of text (e.g., a single electronic document, a group of electronic documents, or the like) can be processed by a reader portion of the system to generate one or more question and answer spaces. The question and answer space can include answerable questions and the answers associated with the questions (referred to as "question and answer pairs"). The retriever portion of the system can retrieve the answer to the question from the one or more pre-constructed question and answer spaces. In some examples, the question answering system and techniques can use a combination of retriever-reader and reader-retriever approaches.

Additional features and advantages of the present application will be set forth in the description which follows, and in part will be obvious from the description, or may be learned by the practice of the examples provided herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing.

DETAILED DESCRIPTION

Figure 1:
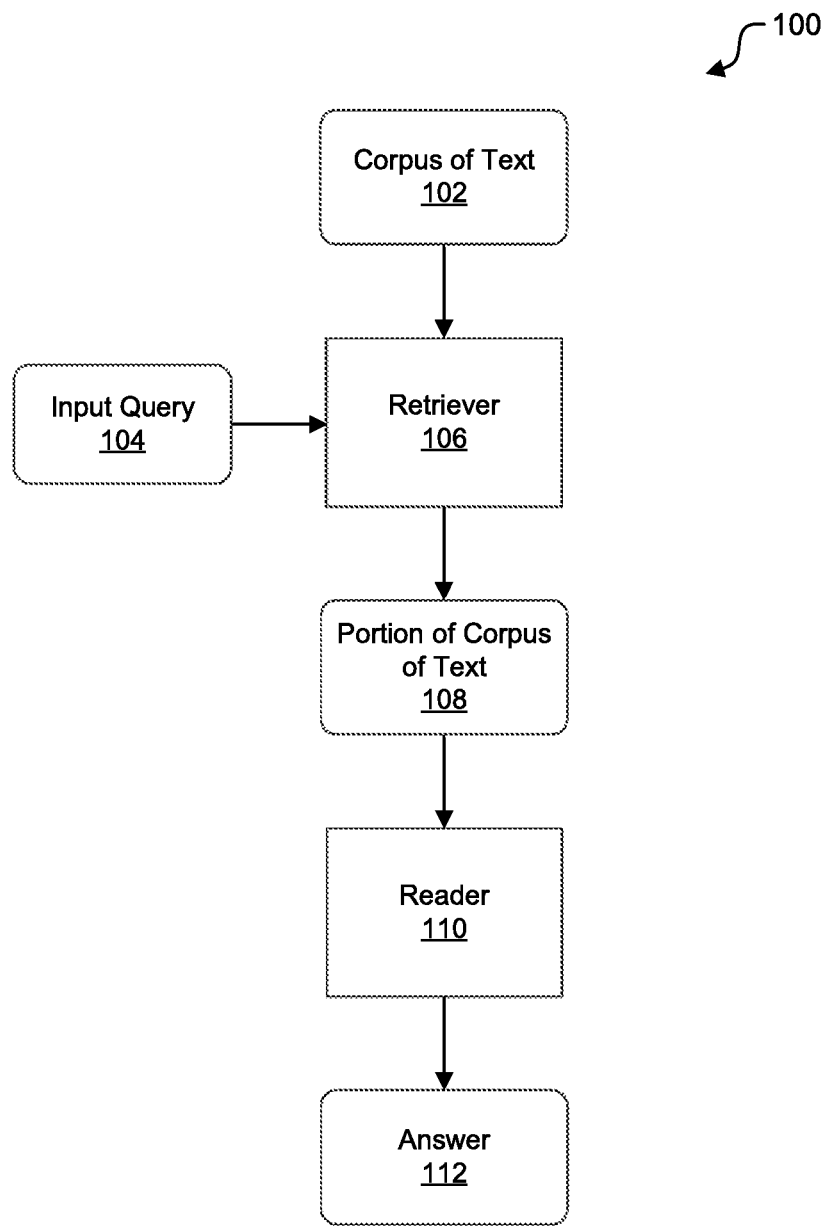
FIG. 1 is a diagram illustrating an example of a system for performing a retriever-reader approach to question answering.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

One or more examples described herein provide benefits and solve one or more of the foregoing or other problems in the art with a question answering system and related techniques that use a reader-retriever approach to perform question answering. As described further below, the reader-retriever approach provides enhanced performance when compared to a retriever-reader approach and other question answering approaches. For instance, a reader portion of the reader-retriever based system can process text and/or other information from a corpus of text (e.g., a single electronic document, a group of electronic documents, or the like) to generate one or more question and answer spaces. As used herein, a question and answer space includes answerable questions and the answers associated with the questions (referred to as "question and answer pairs"). The retriever portion of the reader-retriever based system can retrieve the answer to the question from the one or more pre-constructed question and answer spaces. For instance, as described in more detail herein, the retriever portion of the system can identify a question from a question and answer space that matches a question defined by an input query, and can then determine the answer that is associated with the identified question in the question and answer space. The answer can be output as the answer to the question defined by the input query.

In some examples, to generate the question and answer pairs that make up a question and answer space, the reader portion of the reader-retriever based system generates candidate answers by processing the corpus of text using named entity recognition. Using the named entity recognition, the reader portion can identify named entities by classifying certain words into pre-defined categories or types associated with named entities using the context of the text passage containing the words. Each identified named entity is used as a candidate answer. In some cases, the named entity recognition can be implemented using one or more machine learning models (e.g., deep neural networks) to analyze the text in the corpus of text and generate the answers for the question and answer space. The reader portion of the reader-retriever based system can apply a question generator to the candidate answers to generate a question for each answer. For example, the portion of the text in the corpus of text that includes the candidate answers provides context surrounding the answers. The portion of the text including the candidate answers can be used by the question generator to generate the questions that are then associated with the answers to generate the question and answer pairs that make up the question and answer space.

In some implementations, multiple question and answer spaces can be generated. For instance, a first question and answer space can include question and answer pairs, with one answer assigned to each question. A question and answer pair in the first question and answer space can include a question and an answer associated with that question (the answer to that question). A second question and answer space can include a set of questions (referred to as a question set) that have the same answer. For example, multiple questions that have the same answer can be aggregated into a question set, and the question set can be paired with the shared answer.

As noted above, a retriever portion of the reader-retriever based system can retrieve an answer to an input query from the one or more question and answer spaces. For instance, the retriever portion of the system can receive (e.g., from a user input device) and process an input query including text defining a question. The question defined by the input query can be compared to the various questions in the one or more question and answer spaces to determine a semantic similarity between the input query and the various questions. In some examples, similarity values indicating levels of similarity between the question defined by the input query and the candidate questions from the one or more question and answer spaces can be determined by comparing the text of the input query to text of the candidate questions in the candidate question and answer pairs of the one or more question and answer spaces. A candidate question can be determined to match the question of the input query if a similarity value determined for the candidate question meets a similarity condition. In one illustrative example, the similarity condition can indicate that the similarity value for the candidate question is to be a highest similarity value among the determined similarity values. In another illustrative example, the similarity condition can indicate that the similarity value for the candidate question is to be within a threshold number of highest similarity values among the determined similarity values.

A candidate question meeting the similarity condition can be determined to match the question defined by the input query. The retriever portion of the system can determine the answer that is associated with matching question in the question and answer space. For example, the matching question is part of a question and answer pair, and the answer in the question and answer pair that includes the matching question can be identified from the question and answer space. The identified answer can then be output as the answer to the question defined by the input query.

In some examples described herein, the question answering system and techniques can use a combination of retriever-reader and reader-retriever approaches. For instance, the reader-retriever approach described above can be used to process a corpus of text and to generate one or more question and answer spaces from the corpus of text. An input query can be received and compared to the one or more question and answer spaces to generate one or more candidate answers. A retriever-reader approach can also be used to generate an answer by retrieving a portion of text from the corpus of text and analyzing the retrieved portion of text to generate an answer. The answer generated by the retriever-reader approach can be compared to an answer generated by the reader-retriever approach, and a final output answer can be generated based on the comparison. In one illustrative example, if the answer generated by the retriever-reader approach matches a candidate answer retrieved from the first question and answer space (which includes one answer assigned to each question) generated by the reader-retriever approach, the answer from the retriever-reader approach can be used as the final output answer. In another illustrative example, if the answer generated by the retriever-reader approach does not match the candidate answer retrieved from the first question and answer space (which includes one answer assigned to each question), a candidate answer retrieved from the second question and answer space (sets of questions paired with the shared answers) generated by the reader-retriever approach can be used as the final output answer.

The reader-retriever based question answering system and related techniques described herein provide several advantages over conventional question answering systems. For example, a retriever-reader approach receives a given query, retrieves a portion of text (e.g., one or more text passages) that is potentially related to the query, and reads the retrieved portion of text to get an answer. Both the retriever and the reader of a retriever-reader based system work online by responding to input queries as they are received. Only relevant portions of the text determined by the retriever are fed into the reader for each input query, in which case only a small portion of the corpus of text is considered when determining an answer. Further, the performance of the reader in a retriever-reader model is limited to an upper bound of the retriever, leading to a efficiency-accuracy trade-off that must be balanced. However, if a retriever of a retriever-reader model is designed to be computationally efficient, the results retrieved by the retriever will not be reliable, which limits the effect of the reader in analyzing the retrieved results. On the other hand, to provide more reliable retrieved results, a retriever will need to be made highly complex to a point that the retriever will not be able to provide a timely result to the reader, which can lead to unsuitable delays in providing an answer to a given input query.

The tasks performed by the reader of the reader-retriever approach described herein can be performed offline to generate candidate question and answer pairs (included in one or more question and answer spaces) before a query is processed by one or more retrievers. By generating the candidate question and answer pairs offline before queries are processed, the reader-retriever based question answering system can ensure that each input query benefits from a full scan over the corpus of text and is answered by not only relevant portions of the corpus (e.g., relevant sentences in the text), but also the collective statistics of the entire corpus. For example, the reader-retriever approach can respond to an input query by retrieving at least one question and answer pair that best matches the input query. The question and answer pair is retrieved from the one or more question and answer spaces, which are generated by the reader portion by analyzing the entire corpus of text. Such a solution results in more accurate answers when compared to the retriever-reader approach, as question and answer pairs generated from the entire corpus are considered for each query. The power of the reader of the reader-retriever approach is thus not restricted by the accuracy of the retriever (as is the case with retriever-reader systems), providing better results than retriever-reader-based systems.

In addition, the generation of the one or more question and answer spaces does not rely on assumptions like a graph schema, allowing the reader-retriever system to achieve better question coverage than knowledge graph-based approaches, which are described below.

Additional details regarding existing question answering techniques and the question answer system and techniques described herein will now be provided with reference to the figures.

As previously noted, question answering (QA) is a task of answering a given question based on a given set of text (e.g., a given sentence, passage, document, small document collection, and/or other text). Several methods and datasets have been developed for performing higher quality question answering tasks, including machine learning techniques, knowledge graph based techniques, among other techniques. Among those efforts, one dataset that is commonly used for QA is referred to as Stanford Question Answering Dataset (SQuAD). An initial version of SQuAD contained 107,785 question-answer pairs from 536 articles, where each answer is defined as a text span. A subsequent version (2.0) combines existing SQuAD data with over 50,000 unanswerable questions written adversarially by crowdworkers to look similar to answerable ones. QA models can use the SQuAD dataset to perform accurate QA tasks.

Two types of QA are oftentimes used, including standard question answering (standard QA) and open-domain question answering (OpenQA). In standard QA tasks, it is known which portion of text (e.g., a particular sentence, passage, paragraph, or other portion) contains the answer to a given question. For example, a given paragraph can be provided to a standard QA model along with a question, and the standard QA model can determine an answer to the question from the paragraph.

OpenQA systems are used to enable computing devices to automatically find an answer to a question (e.g., submitted by a user, device, or system) from a corpus of text, such as a large collection of documents. OpenQA has wide variety of applications, such as applications for document understanding, user interaction, search engines, decision making, among others. In one illustrative example of OpenQA in the search engine context, a user can enter a query—"who is the current president of the United States"—into a search engine entry field, and the search engine can return a ranked list of web pages related to the query as well as an answer—"Donald Trump"—to the question. As the number of documents grows on various systems, developing and deploying OpenQA methods that leverage the power of large document collections can be taken advantage of.

Open-Domain Question Answering (OpenQA) tasks are different from and are more difficult than standard QA tasks, due in part to the involvement of a large corpus. For instance, a standard QA algorithm assumes it is known which text (e.g., sentence, passage, document, small document collection, etc.) contains the answer. However, such approximate answer location information is not available for OpenQA tasks. It can be difficult or impossible to directly apply standard QA models to OpenQA tasks due to at least two constraints. For example, it is computationally expensive and unnecessary to scan an entire corpus of text (e.g., with a deep model) for answering a specific question, the answer to which is usually contained in a small portion of the corpus (e.g., in just a few sentences). Further, if the entire corpus is directly fed into a deep model, the large body of irrelevant text from the corpus will lead to a small signal-to-noise ratio and thus result in low accuracy results.

Some solutions to OpenQA are based on a retriever-reader model structure. For instance, OpenQA can be converted to standard QA with the addition of information retrieval techniques, giving rise to the retriever-reader design for OpenQA. FIG. 1 is a diagram illustrating an example of a retriever-reader system 100 for performing a retriever-reader approach to question answering. A retriever 106 of the retriever-reader system 100 has access to a corpus of text 102 and receives an input query 104 that defines a question. The retriever 106 retrieves, from the corpus of text 102, passages that are relevant to the input query 104. A reader 110 of the retriever-reader system 100 reads the retrieved passages and extracts an answer 112 to the input query 104. The reader 110 can use a machine learning model, such as a deep learning neural network model.

One example of a retriever-reader OpenQA approach is DrQA, which answers open-domain questions by first retrieving paragraphs from relevant web pages from the Wikipedia web site. The retrieval step uses a similarity measure used in information retrieval called term frequency-inverse document frequency (TF-IDF). TF-IDF is a numerical statistic that attempts to reflect how important a document in a corpus of text or a portion of a document is to a query. DrQA then reads the question and retrieved paragraphs using recurrent neural networks (RNNs), and predicts the answer span by computing the similarity between RNN-generated representations of the query and the retrieved paragraphs.

The performance of retriever-reader models for OpenQA has not reached high levels of accuracy. For example, while adding a retriever before a reader converts OpenQA to standard QA and thus allows existing QA methods to be applicable to OpenQA settings, such a solution fails to alleviate the difficulty in OpenQA compared to standard QA. The lack of accuracy achieved by retriever-reader OpenQA models is due in part to the large noise in the retrieval step. For example, retriever-reader models face a difficult efficiency-accuracy trade-off. The performance of the reader is limited to an upper bound of the retriever. When a retriever is designed to be computationally efficient, the results retrieved by the retriever will not be reliable (e.g., a retrieved portion of text may not contain a correct answer to a question), limiting the effect of the reader in analyzing the retrieved results. In one illustrative example, the exact match accuracy of DrQA on the SQuAD dataset can achieve up to 69.5% in standard QA settings, whereas the accuracy decreases to 28.4% in open-domain (OpenQA) settings. Computationally efficient retrievers can also lack trainable parameters for recovering from mistakes. On the other hand, to provide more reliable retrieved results, a retriever will need to be made highly complex to a point that the retriever will not be able to provide a timely result to the reader. For instance, a retriever that can provide reliable portions of text for a reader to process may take several seconds to output the results to the reader, which is an unacceptably large delay for an end user experience. Some systems may have sophisticated retrievers that are jointly trained with the readers, but such designs are not scalable to large corpora.

OpenQA solutions also exist that utilize knowledge graphs. A knowledge graph-based solution includes an offline knowledge graph construction engine and an online graph query engine. The graph construction engine scans an entire corpus of text, detects entities (e.g., terms, sentences, paragraphs, or other portions related to people, places, events, time, etc.) within the corpus, recognizes entity relations, and organizes those relations into a knowledge graph. When a user submits a query defining a question, the online graph query engine first detects entities in the query, and extracts relevant entities from the graph as the answer. Examples of such approaches include Google Knowledge Graph™ and Bing Satori™.

A schema of a knowledge graph defines the kinds of nodes and edges that may possibly exist in the knowledge graph. Different knowledge graphs focus on different types of entities and relations, and thus usually have different schemas. For instance, given a set of objects from T types $X=\{X_t\}_{t=1}^T$, where $X_t$ is a set of objects belonging to $t_{th}$ type, a weighted graph $G=<V, E, W>$ is called an information network on objects X, if V=X, E is a binary relation on V, and $W:E \to R^+$ is a weight mapping from an edge $e \in E$ to a real number $w \in R^+$. One illustrative example of a schema of a knowledge graph is a "star schema," which can be defined as an information network $G=<V, E, W>$ on T+1 types of objects $X=\{X_t\}_{t=0}^T$, where $\forall e=<x_i, x_j> \in E, x_i \in X_0 \land x_j \in X_t (t \neq 0)$, or vice versa, and where G is referred to as a star network and $<x_i, x_j>$ is an edge in E. Knowledge graphs and schemas are described in more detail in Sun et al., "Ranking-Based Clustering of Heterogeneous Information Networks with Star Network Schema," in *Proceedings of the 15th ACM SIGKDD International Conference on Knowledge Discovery and Data Mining*, pages 797-806, which is hereby incorporated by reference in its entirety and for all purposes. A schema may be pre-defined, as in the above-defined star schema, or can be automatically discovered from unstructured text. Once a schema is defined or discovered, a knowledge graph can then be constructed from some corpus of text. The relation between a schema and a graph is similar to a Python class and an instance of that class—a schema defines the overall structure of any graphs possibly generated with this schema, and a graph is an "instantiation" of the schema with a specific corpus.

Graph-based QA can be performed using a knowledge graph. For instance, once a knowledge graph is constructed from a corpus of text, QA tasks can be converted to graph search tasks. Finding the most likely answer is done by searching the most relevant node or edge in the graph. The search can be done in various ways, for example by template decomposition, graph embedding, among others.

Knowledge graph-based solutions have various limitations. For example, because the search space is constrained by a knowledge graph and because knowledge graphs are constructed with a given schema, a graph-based QA method can only answer questions about entities and relations covered by both the schema and the given corpus. In one illustrative example, while a knowledge graph-based search engine can provide the exact answer "Donald Trump" when a user enters the question "who is the current president of the United States," the search engine cannot answer the question "who is the first American to win the Nobel Prize for Literature." For such a question, a knowledge graph-based search engine will instead return the top retrieval result, which will be incorrect unless the answer falls within the schema of the knowledge graph. For example, the knowledge graph-based search engine may return a Wikipedia passage related to Sully Prudhomme of France, who was the first Nobel laureate in Literature. One reason for such an incorrect result may be that the quartet "person-country-event-time" can be missing in the schema for the correct answer entity Sinclair Lewis.

Question answering systems and associated techniques are described herein for performing question answering (e.g., OpenQA) using a reader-retriever approach. At least the problem of the efficiency-accuracy trade-off of retriever-reader approaches (where the power of the reader is constrained by the low accuracy of the retriever) and the problem of knowledge-graph based systems being able to answer only questions covered by the graph schema are solved by the reader-retriever approach described herein, which advantageously produces highly accurate answers to input queries as compared the retriever-reader and graph-based solutions. For example, the power of the reader of the reader-retriever approach is not restricted by the accuracy of the retriever (as is the case with retriever-reader systems), providing better results than retriever-reader-based systems. Further, the generation of the one or more question and answer spaces does not rely on assumptions like a graph schema, allowing the reader-retriever system to achieve better question coverage than knowledge graph-based approaches.

Figure 2:
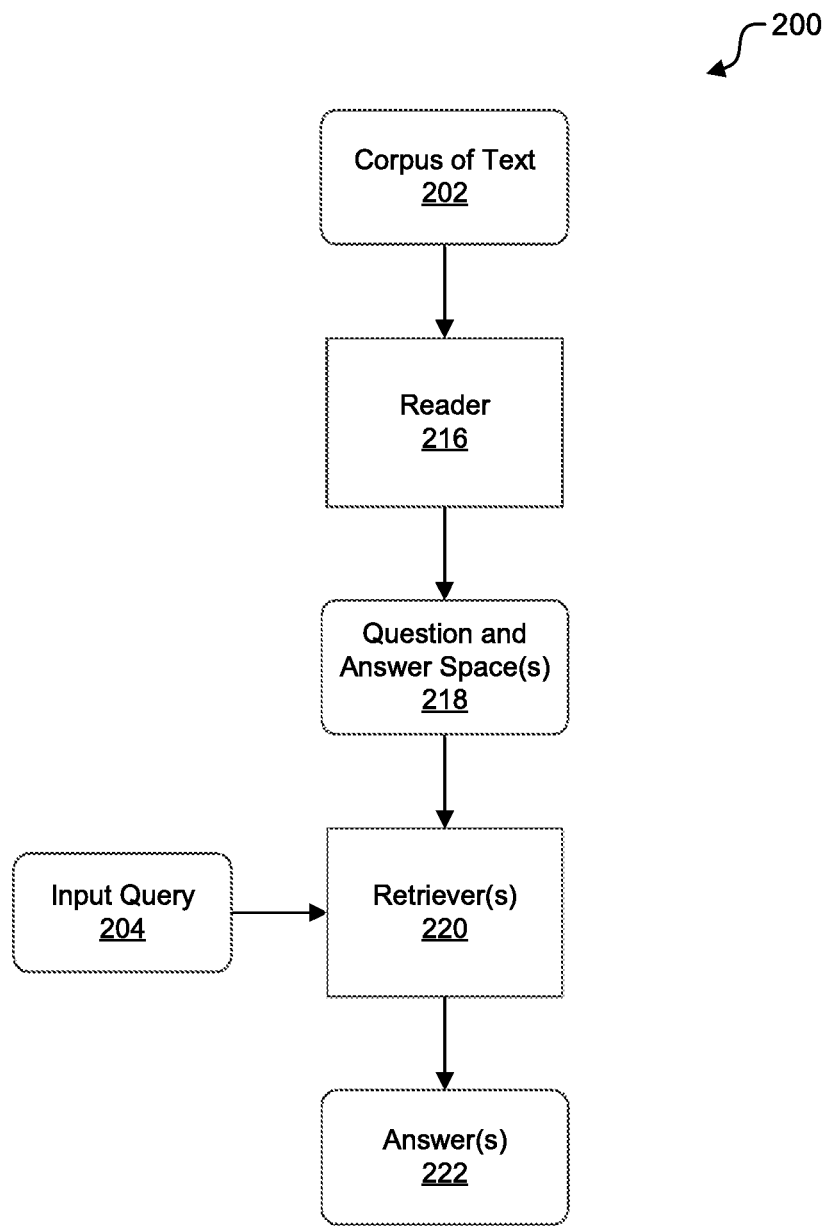
FIG. 2 is a diagram illustrating an example of a system for performing a reader-retriever approach to question answering, in accordance with some examples provided herein.

FIG. 2 is a diagram illustrating an example of a reader-retriever system 200 that can be used to perform the reader-retriever techniques described herein. The reader-retriever system 200 includes a reader 216 and one or more retrievers 220. The reader 216 of the reader-retriever system 200 has access to and can obtain a corpus of text 202. The corpus of text 202 can include a single electronic document (e.g., a webpage, an electronic book, an electronic article, or other document), a group of electronic documents, and/or other text. The reader 216 can process text and/or other information from the corpus of text 202 to generate one or more question and answer spaces 218. A question and answer space includes answerable questions and answers associated with the questions (referred to as "question and answer pairs"). In some cases, as described in more detail herein, multiple question and answer spaces can be generated (e.g., a question and answer space including question and answer pairs that have one answer assigned to each question, a question and answer space including a set of questions referred to as a question set that has the same answer and the associated answer, or other question and answer spaces).

As described in more detail below with respect to FIG. 3, the reader 216 can use a named entity recognition (NER) tool to generate the answers and a question generator to generate the questions in the one or more question and answer spaces 218. In some cases, the reader 216 can use one or more machine learning models, such as deep neural networks, to analyze the corpus of text 202 and generate the answers for the one or more question and answer spaces 218. The question generator can use question generation (QG) techniques to generate a question whose answer is a given text span in a given passage of text. In some cases, the question generator can include an encoder-decoder neural network trained on standard QA datasets (e.g., SQuAD or other dataset), so that the generated questions mimic ground truth questions in the training set. QG and QA can be improved with respect to one another when the machine learning models (e.g., neural networks) are co-trained together.

An input query 204 defining a question can be received (e.g., from a user input device) and processed by one or more retrievers 220 of the reader-retriever system 200. The one or more retrievers 220 can compare the question defined by the input query 204 to the one or more pre-constructed question and answer spaces 218, and based on the comparison can retrieve one or more answers 222 to the question from the one or more question and answer spaces 218. In some cases, as described in more detail below, a semantic similarity between the input query 204 and the questions in the pre-constructed question and answer spaces 218 can be determined, and the one or more questions that are most similar to the input query 204 can be selected. The answers that are paired with the selected one or more questions can then be determined as the one or more answers 222. In some cases, a single question and associated answer can be determined from the one or more question and answer spaces 218, and the answer can be output as a final output answer for the input query 204. In some cases, multiple questions and associated answers can be determined from the one or more question and answer spaces 218, and can be used to determine a final output answer for the input query 204, as described in more detail below with respect to FIG. 3 and FIG. 4.

As described above, a retriever-reader model design (e.g., as shown in FIG. 1) receives a given query, retrieves a portion of text (e.g., one or more text passages) that is potentially related to the query, and reads the retrieved portion of text to get an answer. Both the retriever and the reader work online and respond to received queries. The tasks performed by the reader 216 of the reader-retriever system 200 can be performed offline so that the one or more question and answer spaces 218 are generated before a query is processed by the one or more retrievers 220. For example, before determining any online answers to input queries, a portion of or the entire corpus of text 202 can be scanned offline by the reader 216 to generate the one or more question and answer spaces 218. By generating the one or more question and answer spaces 218 offline before queries are processed, the reader-retriever system 200 can ensure that each input query benefits from a deep scan over the entire corpus of text 202 and is answered by not only relevant portions of the corpus (e.g., relevant sentences in the text), but also the collective statistics of the entire corpus. Such a solution is different from a retriever-reader approach, where only a small portion of the corpus of text is fed by the retriever into the reader for each query. For example, once the one or more question and answer spaces 218 are constructed, the system 200 can respond to online input queries by retrieving a question and answer pair from the one or more question and answer spaces 218 that best matches an input query. In this way, the power of the reader 216 is no longer restricted by the accuracy of the retriever 220 (which is the case with retriever-reader systems), providing better results than retriever-reader-based systems. In addition, the generation of the QA space does not rely on assumptions like a graph schema, in which case the reader-retriever system 200 can achieve better question coverage as compared to knowledge graph-based techniques.

By flipping the retriever-reader structure to a reader-retriever structure, a question answering system is provided that is capable of producing highly accurate QA results, particularly in the OpenQA space where retriever-reader approaches fail to provide accurate results. The reader-retriever system 200 is not constrained by the limitations associated with the retriever-reader approach (e.g., the efficiency-accuracy trade-off described above, where the power of the reader is constrained by the low accuracy of the fast but simple retriever), or those related to knowledge-graph based question answering systems (e.g., a knowledge-graph based system can only answer questions covered by the graph schema).

While the reader-retriever system 200 is shown to include certain components, including the reader 216 and the one or more retrievers 220, one of ordinary skill will appreciate that the reader-retriever system 200 can include more components than those shown in FIG. 2. The components of the reader-retriever system 200 can include software, hardware, or both. For example, in some implementations, the components of the reader-retriever system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the reader-retriever system 200.

In some implementations, a question answering system can use a combination of retriever-reader and reader-retriever approaches. An example of such a system is described below with respect to FIG. 3. For example, the reader 216 of the reader-retriever system 200 described above can be used to process the corpus of text 202 and to generate one or more question and answer spaces 218 from the corpus of text 202. The one or more retrievers 220 can compare the input query 204 to the one or more question and answer spaces 218 to generate one or more candidate answers. A retriever-reader system (not shown) can also be used to generate an answer by retrieving a portion of text from the corpus of text 202. The answer generated by the retriever-reader approach can be compared to the one or more candidate answers generated by the reader-retriever system 200, and a final output answer can be generated based on the comparison.

Figure 3:
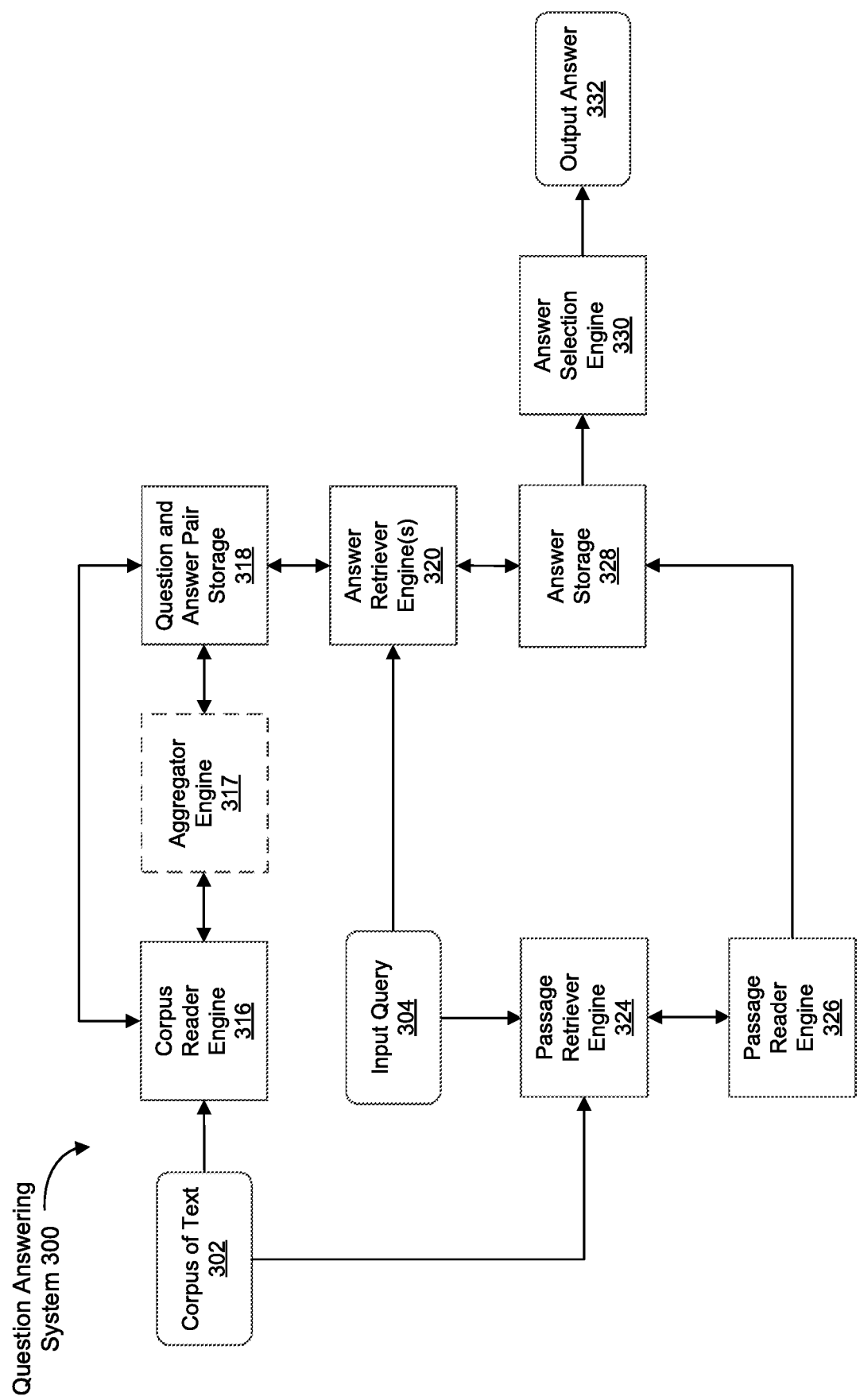
FIG. 3 is a block diagram illustrating an example of a question answering system, in accordance with some examples provided herein.

FIG. 3 is a diagram illustrating an example of a question answering system 300 that utilizes a combination of retriever-reader and reader-retriever approaches. The question answering system 300 includes various components, including a corpus reader engine 316, question and answer pair storage 318, one or more answer retriever engines 320, a passage retriever engine 324, a passage reader engine 326, answer storage 328, and an answer selection engine 330. In some cases, the question answering system 300 can include an aggregator engine 317 (the optional nature of the aggregator engine 317 is illustrated in FIG. 3 with a dashed outline). The components of the question answering system 300 can include software, hardware, or both. For example, in some implementations, the components of the question answering system 300 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the question answering system 300.

While the question answering system 300 is shown to include certain components, one of ordinary skill will appreciate that the question answering system 300 can include more or fewer components than those shown in FIG. 3. For example, the question answering system 300 can include, or can be part of a computing device that includes, one or more input devices and one or more output devices (not shown). In some implementations, the question answering system 300 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 3.

As noted above, the question answering system 300 can be implemented by and/or included in a computing device. In some cases, multiple computing devices can be used to implement the question answering system 300. For example, a computing device used to implement the question answering system 300 can include a personal computer, a tablet computer, a mobile device (e.g., a mobile phone or other mobile device), a wearable device (e.g., a smart watch, a virtual reality headset, an augmented reality headset, and/or other wearable device), a server or multiple servers (e.g., in a software as a service (SaaS) system or other server-based system), and/or any other computing device with the resource capabilities to perform the techniques described herein.

In some implementations, the question answering system 300 can be integrated with (e.g., integrated into the software, added as one or more plug-ins, included as one or more library functions, or otherwise integrated with) one or more software applications, such as a search engine, a web browser, a design application (e.g., Adobe InDesign™, Adobe Illustrator™, Adobe Acrobat™, Adobe Photoshop™, Adobe After Effects™, among others) that allows a user (also referred to as an end-user) to search for one or more items. The software application can be a mobile application installed on a mobile device (e.g., a mobile phone, such as a smartphone, a tablet computer, a wearable device, or other mobile device), a desktop application installed on a desktop computer, a web-based application that can be accessed using a web browser or other application, or other software application. In some implementations, the question answering system 300 can be implemented in a suite of software applications.

The corpus reader engine 316 of the question answering system 300 is used to process the corpus of text 302 to generate question and answer pairs that are stored in the question and answer pair storage 318. The corpus of text 302 can include any collection of text, such as a single electronic document (e.g., a webpage, an electronic book, an electronic article, or other document), a group of electronic documents, and/or other text. Similar to the reader 216 of the system 200, the tasks performed by the corpus reader engine 316 can be performed offline to generate question and answer pairs before an input query is received and processed. In some implementations, the tasks performed by the corpus reader engine 316 can be performed online when an input query is processed. The question and answer pairs generated by the corpus reader engine 316 can include one answer assigned to each question.

In some implementations, the corpus reader engine 316 can use a named entity recognition (NER) tool to generate the answers for the question and answer pairs. For example, the corpus reader engine 316 can apply the NER tool to the corpus of text 302 to detect named entities from the corpus of text 302. Using the NER tool, the corpus reader engine 316 can classify certain words into pre-defined categories or types associated with named entities based on the context of the text passage containing the words. For example, the context of the text surrounding a term or group of terms can be used to determine whether a term or a group of terms from the corpus of text 302 is a named entity. In some cases, a dictionary or other catalog that includes the pre-defined categories or types can be accessed by the NER tool and used to classify a term or group of terms in the corpus of text 302. In some examples, unsupervised named entity recognition can be performed. In one example, a term or group of terms can be compared to the pre-defined categories or types to determine whether that term or group of terms is a named entity. The pre-defined categories or types can include person names, place names, organizations, locations, time expressions, quantities, percentages, any combination thereof, and/or any other categories or types. In one illustrative example, a sentence reading "Person A was the President of the United States from 2000-2004" can be processed by the corpus reader engine 316 using the NER tool to generate an annotated block of text that identifies the named entities as follows (with the entity being in [brackets] and the corresponding annotation shown as a subscript in ALL CAPS): "[Person A]$_{PERSON}$ was the President of the [United States]$_{PLACE}$ from [2000-2004]$_{TIME}$." The named entities form the set of candidate answers (each named entity is a candidate answer) in the question and answer pairs, which can later be returned as answers for online queries. Each detected entity can be assigned an entity identifier (ID), and each entity ID corresponds to a candidate answer (or a group of candidate answers that have been normalized, as discussed below). In some cases, an entity ID can be a numerical value (e.g., a value from 0-N, with N being a positive integer, or other suitable value).

As noted above, the NER tool can access a dictionary or other catalog that includes the pre-defined categories or types, which can be used to classify a term or group of terms in the corpus of text 302. In some cases, the NER tool can link the named entities to one or more electronic documents, such as web pages or other electronic document, which can provide meaningful context for determining whether a term or group of terms in the corpus of text 302 is a given category or type of named entity. For instance, if a term or group of terms from the corpus of text 302 is included in a title of a web page (e.g., a Wikipedia page) or other portion of the web page, the term or group of terms can be identified as a named entity. In one illustrative example, if each web page (.g., Wikipedia page) is assigned a unique natural number ID from 0-N, and a term or group of terms from the corpus of text 302 is used in some web pages to point to a web page with ID=n, then the term or group of terms is more likely to be identified as a named entity whose ID is n.

One illustrative example of an NER tool is TAGME, which detects named entities and links the named entities to Wikipedia pages. For instance, using TAGME, the plain-text named entities detected from the corpus of text 302 can be augmented with pertinent hyperlinks to Wikipedia pages. The annotations can provide structured knowledge to an unstructured fragment of text (in the event the corpus of text 302 includes unstructured text). The annotations can allow the corpus reader engine 316 to determine whether a term or group of terms in the corpus of text 302 is a named entity. In one illustrative example, the identification of a web page (e.g., a Wikipedia page) describing who "Barack Obama" is can be used to identify the group of terms "Barak Obama" in a paragraph of the corpus of text 302 as a named entity with a "person" type or category.

In TAGME, the context of a sentence (or other portion of text) is used along with the Wikipedia pages. For instance, in TAGME, a text anchor for a Wikipedia page p is defined as the text used in another Wikipedia page to point to p. Due to polysemy and variant names, each Wikipedia page may have multiple anchors, and an anchor for a Wikipedia page may also be an anchor for another page. Given an input text T, TAGME first extracts all anchors from T into a set $A_T$.

Each anchor $a \in A_T$ may point to more than one Wikipedia pages (in which case each anchor can have more than one "senses"), and TAGME computes a score for each possible sense $p_a$ by computing a "collective agreement" between $p_a$ and the possible senses of all other anchors detected in T. TAGME is described in more detail in Ferragina et al., "TAGME: On-the-fly Annotation of Short Text Fragments (by Wikipedia Entities)," In Proceedings of the 19th ACM international conference on Information and knowledge management, pages 1625-1628, which is hereby incorporated by reference in its entirety and for all purposes. Other NER tools can also be used by the corpus reader engine 316, such as NetOwl Extractor described in Krupka et al., "Iso-Quest, Inc.: Description of the NetOwl™ Extractor System as Used for MUC-7," the Maximum Entropy Named Entity (MENE) NER tool described in Borthwick et al., "NYU: Description of the MENE Named Entity System as Used in MUC-7," both of which are hereby incorporated by reference in their entirety and for all purposes, and/or any other suitable NER tool.

The corpus reader engine 316 can apply a question generator to the set of candidate answers (e.g., generated by the NER tool) to generate a question for each answer. For instance, once the named entities are detected, the corpus reader engine 316 has the named entities (e.g., corresponding to entity IDs) and the portion of the text (e.g., the paragraphs) from the corpus of text 302 that includes the named entities. The portion of the text including the named entities provides the context surrounding the named entities, and can be used to generate the questions that are then associated with the named entities (the answers) to generate the question and answer pairs. The question generator generates a question whose answer is the candidate answer, attempting to mimic a human-generated question. For example, a paragraph containing a particular named entity can be used to generate a question whose answer is the named entity, and the named entity will then be paired with the generated question to form a question and answer pair (where the candidate answer in the question and answer pair is the named entity).

In some implementations, the question generator can include an encoder-decoder neural network structure. For example, an encoder-decoder neural network includes one or more convolutional layers (the encoder portion of the neural network) and corresponding deconvolutional layers (the decoder portion of the neural network). In some cases, the encoder-decoder neural network can be trained using the SQuAD dataset described above. One of ordinary skill will appreciate that other dataset(s) can be used to train a neural network to generate questions from a paragraph or other portion of text containing a named entity/candidate answer. For instance, the SQuAD dataset includes paragraphs, questions related to the content of the paragraphs, and the answers to the questions (e.g., a paragraph, a question related to the paragraph, and the answer to that question). Given a paragraph and an answer, the encoder-decoder neural network-based question generator can generate a sequence of words that make up a question. The generated question can be compared to a ground truth question in SQuAD or other dataset (which is the actual question about that paragraph whose answer is the given answer), and the difference between the generated question and the ground truth question can be minimized using an error or loss function. For example, an error or loss can be determined based on any suitable error or loss function, such as a using mean squared error (MSE) function, a mean absolute error (MAE) function, a Huber loss function, a log cosh loss function, a quantile loss function, a log loss function, an exponential loss function, a focal loss function, a cross-entropy loss function, a hinge loss functions, a Kullback-Liebler (KL) divergence loss function, a bilingual evaluation understudy (BLEU) score (which is a metric for text similarity), any suitable combination thereof, and/or other loss function. For instance, using MSE as an example, the corpus reader engine 316 can determine the sum of one-half times the ground truth output (the known ground truth question) minus the output provided by the neural network, squared.

Backpropagation can be used to update the parameters of the neural network in order to maximize a chosen objective (e.g., the multinomial logistic regression objective or other chosen objective). For instance, using the determined loss, a backpropagation can be performed to determine whether parameters (e.g., weights, biases, etc. of hidden layers (e.g., convolutional and/or deconvolutional layers) of the neural network) of the neural network need to be adjusted to improve the accuracy by reducing the error to be within a certain threshold error or to be within a threshold similarity to the corresponding ground truth output. For instance, based on the determined error or loss associated with the neural network, one or more modifications can be performed to reduce or minimize the error/loss. For example, the backpropagation engine can adjust the internal machine learning parameters (e.g., by modifying the weights and/or other parameters) of the neural network, which will effectively change the output generated by the neural network when another input is received, and thus will reduce the overall loss.

Once the parameters (e.g., the weights and/or other parameters of the hidden layers) of the neural network are adjusted based on the loss, another set of input data (e.g., a paragraph and an answer) can be input to the neural network. The neural network can then generate another output question based on the new set of input data, and a new error or loss associated with the new output can be determined based on a corresponding ground truth question. The loss associated with the new output will again be used to determine how much the neural network needs to be adjusted to further increase its output accuracy. For example, the backpropagation engine can further modify the parameters (e.g., weights and/or other parameters) of the neural network to further reduce the error associated with the neural network. The loss determination and backpropagation processes can be repeated for several iterations (also referred to as epochs) to improve the accuracy of the neural network until a predicted output is generated that is below a threshold error or within the threshold similarity of the ground truth output.

In some cases, the encoder-decoder network structure can include a question answering reward and a question fluency reward tuned with policy gradient optimization, as described in in Yuan et al., "Machine Comprehension by Text-to-Text Neural Question Generation," Proceedings of the 2nd Workshop on Representation Learning for NLP, pages 15-25, Vancouver, Canada, Aug. 3, 2017, which is hereby incorporated by reference in its entirety for all purposes.

Once the neural network is trained, the trained neural network of the question generator of the corpus reader engine 316 can be used to generate questions from the corpus of text 302. As noted previously, the question generator can generate the questions using the text from the corpus of text 302 and using the detected named entities that make up the candidate answers. A result of the question generation performed by the corpus reader engine 316 is thus a set of candidate question-answer pairs, with each generated question being associated with the candidate answer for which it was generated. As described above, each candidate question and answer pair generated by the corpus reader engine 316 includes one answer (e.g., one entity ID) assigned to each question. The set of candidate question and answer pairs output by the corpus reader engine 316 is referred to herein as the QA space. The collection of text (e.g., a collection of sentences or other text) from the corpus of text 302 is referred to herein as the text space. The question and answer pairs of the QA space are stored in the question and answer pair storage 318.

In some cases, the QA space can include duplicate named entities and/or duplicate named entity derivatives (e.g., the named entity "Obama" is a derivative of the named entity "Barack Obama," with both named entities referring to the same person). In some cases, the QA space can include multiple questions having the same answer. As noted above, the question answering system 300 can include the aggregator engine 317 in some implementations. The aggregator engine 317 can be used to normalize and link named entities with a common entity ID (in some cases, entity normalization and linking can be performed by the corpus reader engine 316), and/or can be used to aggregate questions that share the same answer. For example, in some cases, the aggregator engine 317 can normalize the named entities (used as the answers in the candidate question and answer pairs) and can perform entity linking to associate the normalized named entities with a common entity ID. As noted above, there can be different ways of referring to the same person, place, or thing. In one illustrative example, the named entities "Barak Obama," "Barak," and "Obama" refer the same person. The aggregator engine 317 (or in some cases the corpus reader engine 316) can aggregate the three different named entities that refer to Barak Obama, and can link the aggregated named entities with an entity ID assigned to the named entity "Barak Obama." Once the corpus reader engine 316 links the three entities "Barak Obama," "Barak," and "Obama" to the entity ID for "Barak Obama," the corpus reader engine 316 knows that all three entities refer to the same common entity identified by the entity ID.

As noted above, the aggregator engine 317 can be used to aggregate questions that share a same answer. In some cases, the aggregator engine 317 can aggregate questions sharing the same answer after the named entities (answers) are normalized and linked to one another as described above. For example, in some cases, there can exist in the QA space a set of multiple questions that share the same entity ID (and thus have the same answer or normalized answer). In one illustrative example, the phrase "Ohio State Buckeyes" can occur multiple times in the corpus of text 302, and each occurrence can be detected as a named entity. A different question can be generated for each occurrence of the named entities, resulting in multiple questions for the same answer (corresponding to the "Ohio state Buckeyes" named entity). In such cases, the aggregator engine 317 can be used to aggregate all questions that have the same answer into a set, and can pair that set of questions with the entity ID of the shared answer. Based on the question aggregation (and in some cases the answer normalization), the aggregator engine 317 can output a collection of {Q}A pairs (with {Q} referring to a set of questions associated with the answer), in which each answer is associated with all possible ways of asking about that answer. The collection of {Q}A pairs is referred to herein as the {Q}A space. The collection of the {Q}A pairs in the {Q}A space is also stored in the question and answer pair storage 318. In some cases, the QA space can be stored separately from the {Q}A space (e.g., in a separate storage, in a separate portion of the same storage, or other separate storage).

Once the question and answer pairs (QA pairs) from the QA space and the {Q}A pairs from the {Q}A space are stored in the question and answer pair storage 318, the one or more answer retriever engines 320 can access the question and answer pair storage 318 to retrieve one or more question and answer pairs. The one or more answer retriever engines 320 can receive the input query 304 as input. The input query 304 includes text and/or other information defining a question. In some cases, the input query 304 can be received by an input device, such as an input of a client device (e.g., a touchscreen input from a mobile device, a keyboard input from a mobile device or computer, a gesture input, a voice input, and/or any other input). For instance, an end user may type a question into a search function of a software program (e.g., Adobe Creative Cloud™, a search engine, or other software program), and the input query 304 can be generated based on the typed question.

The one or more answer retriever engines 320 can use the input query 304 to select the one or more QA pairs from the QA space and/or one or more {Q}A pairs from the {Q}A space. For example, the one or more answer retriever engines 320 can compare the input query 304 to the questions in the QA space and the {Q}A space to determine one or more questions that are most similar to the question defined by the input query 304. In some examples, the one or more answer retriever engines 320 can include a first retriever engine for retrieving one or more QA pairs from the QA space and a second retriever engine for retrieving one or more {Q}A pairs from the {Q}A space. The first retriever engine and the second retriever engine can perform the same retriever function or can perform different retriever functions. In another example, the one or more answer retriever engines 320 can include a single retriever engine for retrieving one or more QA pairs from the QA space and for retrieving one or more {Q}A pairs from the {Q}A space. The single retriever engine can perform the same retriever function for retrieving the one or more QA pairs from the QA space and the one or more {Q}A pairs from the {Q}A space, or can perform different retriever functions for retrieving the one or more QA pairs and for retrieving the one or more {Q}A pairs.

As noted above, the one or more answer retriever engines 320 can compare the text of the input query 304 to the text of the questions in the QA space and the text of the questions in the {Q}A space to determine which question or questions are a closest match to the question defined by the input query 304. The one or more answer retriever engines 320 can determine similarity values indicating levels of similarity between the question defined by the input query 304 and the questions in the candidate question and answer pairs of the QA space and the {Q}A space. The similarity values can be determined by comparing the text of the input query to text of the questions in the candidate question and answer pairs. In one illustrative example, as described below, dot products can be determined between a vector representation of the input query and vector representations of each question in the QA space and the {Q}A space, which can result in a value between a range of values. A question from a candidate question and answer pair can be determined as a match with the question defined by the input query 304 if a similarity value determined for the candidate question and answer meets a similarity condition. In one illustrative example, the similarity condition can indicate that the similarity value for the candidate question and answer pair is to be a highest similarity value among the determined similarity values. For instance, the question resulting in the highest similarity value out of the questions from the candidate question and answer pairs can be selected as the question matching the input query 304. In another illustrative example, the similarity condition can indicate that the similarity value for the candidate question and answer pair is to be within a threshold number of highest similarity values among the determined similarity values. For instance, the top k questions with the highest similarity values out of the questions from the candidate question and answer pairs can be selected as the questions matching the input query 304. The term k is a positive integer value, and can be set to any suitable value, such as 5, 10, 15, or other suitable number.

In some examples, the one or more answer retriever engines 320 can generate a vector representation (referred to as an embedding vector or an embedding) for the input query 304 and one or more vector representations (or embedding vectors) for the text passages contained in the QA space and the {Q}A space. In some cases, the embedding vectors can be generated using a neural network encoder, which can convert text to a mathematical vector representation of that text (e.g., a string of numbers with values defining the text). The embeddings can be word-level embeddings (e.g., a vector representation for each word) or sentence-level embeddings (e.g., a vector representation for each question). Any suitable technique can be used to generate a vector or tensor representation for the one or more questions from the QA space and the {Q}A space. One illustrative example of technique for generating embeddings is the Google Universal Sentence Encoder (Google USE), which produces sentence-level embeddings. Google USE is described in Cer et al., "Universal Sentence Encoder," arXiv preprint arXiv: 1803.11175, which is hereby incorporated by reference in its entirety and for all purposes. For example, in some implementations, the embedding vectors for the input query 304 and the embedding vectors for the questions in the QA space and the questions in the {Q}A space can be generated using Google USE, which can then be used by the one or more answer retriever engines 320 to retrieve a question that is semantically most similar to the input query 304.

In some implementations, the one or more answer retriever engines 320 can determine a dot product (also referred to as cosine similarity) of the query embedding vector (of the input query 304) and the question embedding vectors (of the questions from the QA pairs and/or {Q}A pairs) to determine a semantic similarity between the question defined by the input query 304 and the text of the questions in the QA space and the {Q}A space. Based on determining the dot product, a question can be determined from the QA space and/or the {Q}A space that is semantically most similar to the input query 304. For example, the dot product determined between the embedding vector of the input query 304 and the embedding vector of each question in the QA space and the {Q}A space can yield a value (also referred to as a similarity value) between a range of values. For example, a range of 0 to 1 can be used, where a value of 0 indicates low similarity between two vectors and a value of 1 indicates a high similarity (e.g., an exact match) between to vectors. In another example, a range of −1 to 1 can be used, where a value close to 0 indicates independence or orthogonality between two vectors, a value close to 1 indicates a highly positive similarity (e.g., an exact or very close match) between two vectors, and a value close to −1 indicates a highly negative similarity (e.g. opposite semantics). Values between −1 and 1 (or between 0 and 1) indicate varying degrees of similarity. Based on the dot product-based search performed by the one or more answer retriever engines 320, the one or more questions from the QA space and/or the {Q}A space that have a highest value between the given range of values can be selected as the question matching the question defined by the input query 304, and the one or more answers associated with the selected one or more questions can be determined as candidate answers. For the {Q}A space, given the dot product between the embedding vector of the query 304 and the embedding vectors of the questions in the various sets of questions (e.g., $\{Q\}_1$, $\{Q\}_2$, ... $\{Q\}_M$, with M being a positive integer value), the one or more answer retriever engines 320 can determine the set of questions $\{Q\}_m$ that is most similar to, or is mostly likely to generate, the input query 304. The one or more answer retriever engines 320 can retrieve from the {Q}A space the answer associated with the determined set of questions {Q}. The one or more answers determined by the one or more answer retriever engines 320 can be stored in the answer storage 328.

As noted above, in some cases, a similarity condition can indicate that the similarity value for a candidate question and answer pair is to be a highest similarity value among the determined similarity values. For instance, the question with the highest value can be selected as the question matching the input query 304, and the answer associated with the selected question can be selected as a candidate answer for the input query 304. In some cases, the similarity condition can indicate that the similarity value for the candidate question and answer pair is to be within a threshold number of highest similarity values among the determined similarity values. For instance, the top k questions with the highest dot product values can be selected, and the k answers associated with the selected k questions can be selected as a set of candidate answers for the input query 304. The term k is a positive integer value. The value for k can be set to any suitable value, such as 5, 10, 15, or other suitable number. In one illustrative example with k equal to 10, the top 10 questions are identified, and the 10 answers from the QA pairs that are associated with those 10 questions are selected as the k candidate answers. In some cases, a single answer is determined from the {Q}A pairs and a set of k answers is determined from the QA pairs, as described further below. As described in more detail below, an answer selected by the passage reader engine 326 from the corpus of text 302 can be compared to the k answers to determine a final output answer for the input query 304.

In some cases, the QA space and the {Q}A space can be searched separately (e.g., sequentially or in parallel) by the one or more answer retriever engines 320 (e.g., by separate retriever engines or by the same retriever engine). In such cases, one or more candidate answers can be determined from the QA space (e.g., a single candidate answer or a set of k candidate answers) and an answer can be determined from the {Q}A space. As described in more detail below, in some cases, a final output answer can be determined for the input query 304 based on the answer from the {Q}A space, the answer or k answers from the QA space, and an answer determined by the passage reader engine 326 from the corpus of text 302.

In some implementations, similarity metrics other than a dot product can be used to determine similarity between the input query 304 and the text of the questions in the QA space and the {Q}A space. Other similarity metrics that can be used include sum of absolute differences (SAD), mean squared error (MSE), root mean squared error (RMSE), sum of square difference (SSD), or other suitable metric.

Another technique that can be used by the one or more answer retriever engines 320 for computing a representation of the question defined by the query 304 and the questions in the QA space and the {Q}A space is the BM25 technique, which is a bag-of-words approach that provides a ranking function used to estimate the relevance of text (e.g., documents) to a given search query. The BM25 technique is a heuristic ranking function. For instance, the bag-of-words retrieval function of BM25 can be used to rank a set of text passages (e.g., questions) based on the terms from the question appearing in each text passage, regardless of the proximity of the terms within the text passages. Any other similarity determination technique can be used by the one or more answer retriever engines 320, such as a Bayesian model (e.g., based on a maximum likelihood method), among others.

The passage retriever engine 324 of the question answering system 300 can be used to process the corpus of text 302 to retrieve a passage from the corpus of text 302. For example, the input query 304 can be input to the passage retriever engine 324 along with the corpus of text 302. Given the input query 304, the passage retriever engine 324 can compare the input query 304 to the text space of the corpus of text 302 to determine one or more passages from the text space that are most similar to the question defined by the input query 304. For example, similar to that described above with respect to the one or more answer retriever engines 320, the passage retriever engine 324 can generate embedding vectors for the passages (e.g., sentence-level or word-level embeddings of the text in the passages) in the corpus of text 302, such as using Google USE or other suitable technique for generating embedding vectors from text. In some cases, the passage retriever engine 324 can generate an embedding vector for the input query 304. In some cases, the passage retriever engine 324 can obtain the embedding vector for the input query 304 from the one or more answer retriever engines 320, in which case the passage retriever engine 324 may not generate an embedding vector for the input query 304. In some cases, the passage retriever engine 324 can generate the embedding vector for the input query 304, and can provide the embedding vector for the input query 304 to the one or more answer retriever engines 320, in which case the one or more answer retriever engines 320 may not generate an embedding vector for the input query 304.

Using the embedding vector of the input query 304 and the embedding vectors of the passages of text from the corpus of text 302, the passage retriever engine 324 can determine a dot product of the query embedding vector (of the input query 304) and each passage embedding vector to determine a semantic similarity between the question defined by the input query 304 and the corpus of text 302. A passage of text (or multiple passages of text in some cases) that is semantically most similar to the input query 304 can be selected for processing by the passage reader engine 326. For example, based on the dot product, the one or more passages from the text space that has a highest value between a given range of values (e.g., between 0 and 1 or between −1 and 1) can be selected as the one or more passages that will be provided to the passage reader engine 326 for processing.

The passage reader engine 326 can receive as input the one or more text passages determined by the passage retriever engine 324. The passage reader engine 326 can read the one or more text passages and can determine an answer from the one or more text passages. The answer determined by the passage reader engine 326 can be stored in the answer storage 328. The passage reader engine 326 can use any suitable technique for predicting an answer to a given question from a set of text. In some cases, a neural network based reader can be used by the passage reader engine 326 to read the one or more passages retrieved by the passage retriever engine 324. One illustrative example of a neural network based reader is Bidirectional Encoder Representations from Transformers (BERT), fine-tuned on the SQuAD dataset, which can be used to read the retrieved passage and predict the answer. BERT is an encoder-decoder neural network model. BERT is designed to pretrain deep bidirectional representations from unlabeled text by jointly conditioning on both left and right context in all layers. The input to the encoder of the encoder-decoder network is a question and a paragraph, and the output of the decoder is a sequence. The length of the sequence equals the length of the input sequence and values denote whether the input word at the corresponding position is part of the answer. The similarity between the output sequence and the golden truth location of the answer is used for training (or fine-tuning as in the BERT). Further details regarding BERT are described in Devlin et al., "Bert: Pre-training of deep bidirectional transformers for language understanding," arXiv preprint arXiv:1810.04805 (2018) which is hereby incorporated by reference in its entirety and for all purposes.

As noted above, the one or more answers determined by the one or more answer retriever engines 320 and the answer determined by the passage reader engine 326 can be stored in the answer storage 328. The answer selection engine 330 has access to the answer storage 328, and can determine a final output answer for the input query 304 from the stored answers. The answer selection engine 330 can compare the answer generated by the passage reader engine 326 to the one or more answers determined by the one or more answer retriever engines 320, and can determine a final output answer based on the comparison. As noted above, in some cases, a single answer is determined from the {Q}A pairs in the {Q}A space and a set of k answers is determined from the QA pairs in the QA space. In one example, if the answer generated by the passage reader engine 326 matches a candidate answer from the set of k answers determined from the QA space, the answer generated by the passage reader engine 326 can be selected as the final output answer for the input query 304. In another example, if the answer generated by passage reader engine 326 does not match a candidate answer from the set of k answers determined from the QA space, the candidate answer determined from the {Q}A space can be used as the final output answer for the input query 304.

Figure 4:
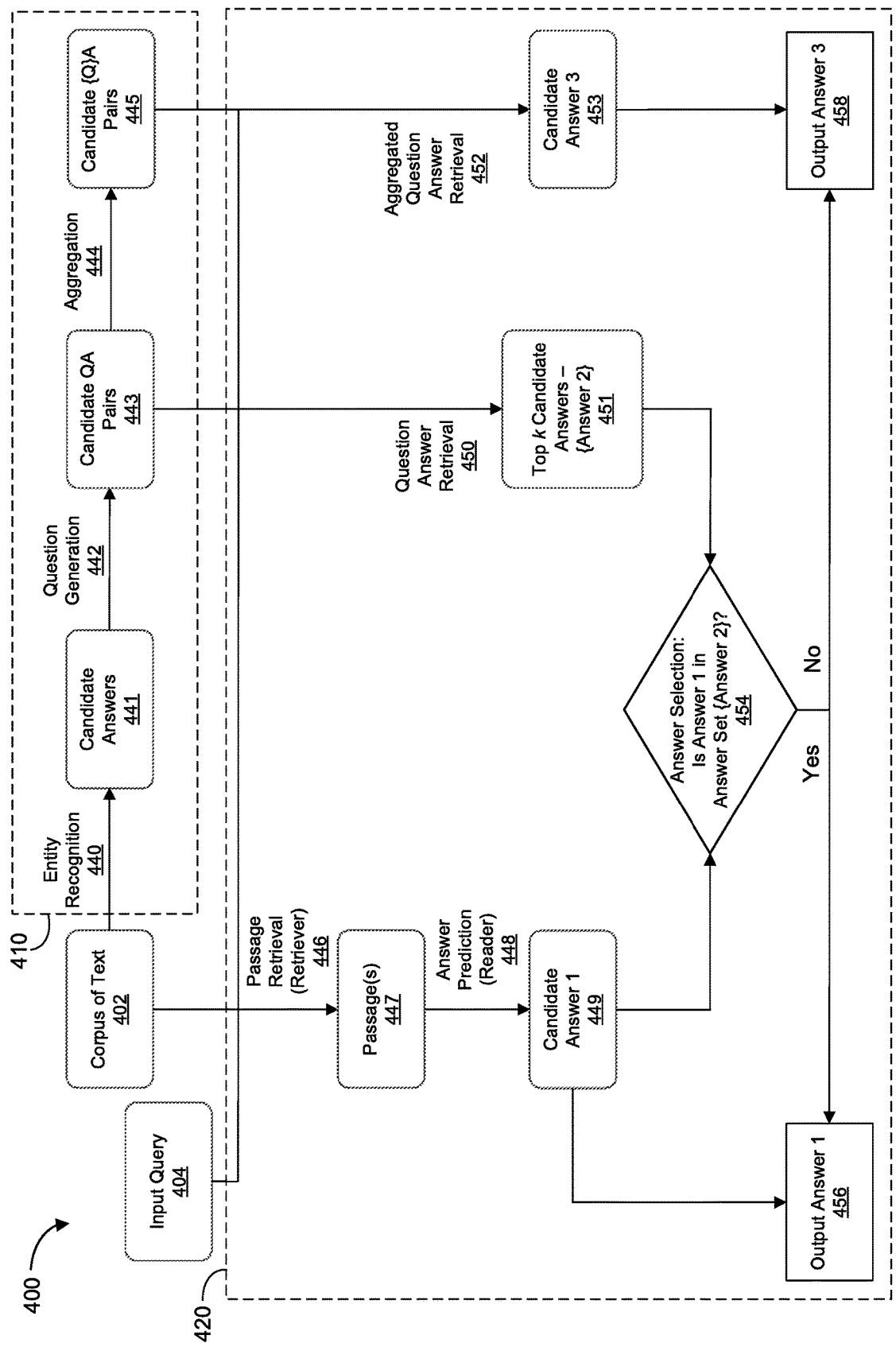
FIG. 4 is a flow diagram illustrating an example of question answering process using a retriever-reader model and a reader-retriever model, in accordance with some examples provided herein.

FIG. 4 is a diagram illustrating an example process 400 of performing question answering using the question answering system 300. As shown, the process 400 includes an offline sub-process 410 and an online sub-process 420. The offline sub-process 410 can be performed before an input query (e.g., input query 404) is received and processed by the process 400. The online sub-process 420 can be performed after the offline sub-process 410 is complete, and in response to receiving an input query (e.g., input query 404).

A corpus of text 402 is used as input to the offline processed by the offline sub-process 410 and by the online sub-process 420. The offline sub-process 410 obtains (e.g., receives or retrieves from memory or other storage) the corpus of text 402 or a portion of the corpus of text 402 (e.g., a document of the corpus of text 402 from memory or other storage), and performs entity recognition at operation 440 to recognize or generate named entities from the corpus of text 402. In some implementations, the entity recognition can be performed by the corpus reader engine 316 of the question answering system 300. As described above, the corpus reader engine 316 can use a named entity recognition (NER) tool or other suitable technique to recognize or generate the named entities. The named entities can be stored as candidate answers 441. Each candidate answer in the candidate answers 441 can be assigned an entity ID.

At operation 442, the offline sub-process 410 can perform question generation using the candidate answers 441 and the corpus of text 402 to generate a question for each candidate answer of the stored candidate answers 441 (corresponding to the named entities). Operation 442 can be performed by the corpus reader engine 316 in some implementations. For example, as described above, the corpus reader engine 316 can apply a question generator to the set of candidate answers (e.g., generated by the NER tool) and the corpus of text 402 (which provides the context surrounding the named entities) to generate a question for each answer. The answers and the question from which the questions were generated are stored as candidate question and answer pairs (QA pairs) 443. For instance, each question can be associated with the entity ID of its associated answer.

At operation 444, the offline sub-process 410 can perform aggregation to aggregate questions that have a same answer. In some cases, the operation 444 can also perform answer normalization and entity linking, as described above. Operation 444 can be performed by the aggregator engine 317 in some implementations. For example, the aggregator engine 317 can aggregate all questions from the candidate QA pairs 443 that have the same answer into a question set {Q}, and can pair that set of questions {Q} with the entity ID of the shared answer. The aggregated question and answer pairs are stored as candidate question set-answer pairs ({Q}A pairs) 445.

The candidate QA pairs 443 and the candidate {Q}A pairs 445 can be stored for later use by the online sub-process 420. The online sub-process 420 can be initiated in response to receipt of an input query (e.g., input query 404). For example, an input query 404 is received, thus initiating the online sub-process 420. The input query 404 is input for processing by a passage retrieval operation 446, a question answer retrieval operation 450, and an aggregated question answer retrieval operation 452 of the online sub-process 420. The passage retrieval operation 446 also accesses the corpus of text 402, and compares the input query 404 to the various passages of text in the corpus of text 402. In some implementations, operation 446 can be performed by the passage retriever engine 324. For example, as described above, given the input query 404, the passage retriever engine 324 can compare the input query 404 to the text space of the corpus of text 402 to determine one or more passages from the text space that are most similar to the question defined by the input query 404. Based on the comparison, the passage retrieval operation 446 can retrieve one or more passages 447 from the corpus of text 402, and can provide the one or more passages 447 for processing by the answer prediction operation 448. In some cases, the passage retrieval operation 446 can use Google USE or other suitable technique for retrieving the one or more passages 447 from the corpus of text 402.

The answer prediction operation 448 processes the one or more passages 447 to predict an answer. The answer prediction operation 448 can be performed by the passage reader engine 326 in some implementations. For example, the passage reader engine 326 can read the one or more passages 447 and can determine an answer from the one or more text passages. The predicted answer is denoted as candidate answer 1 449 in FIG. 4. In some cases, the answer prediction operation 448 can use BERT or other suitable technique for reading the one or more passages 447 and recognizing or generating the candidate answer 1 449 from the one or more passages 447.

The question answer retrieval operation 450 compares the input query 404 to the candidate QA pairs 443, and outputs a top k candidate answers 451 (denoted as {Answer 2}, indicating a set of answers). The top k candidate answers 451 can include one or more answers, and can include the answers to the questions from the candidate QA pairs 443 that are most similar to the input query 404, as determined based on the comparison of the input query 404 to the candidate QA pairs 443. In one illustrative example, the question answer retrieval operation 450 can determine top 15 questions having the highest match values (e.g., based on a dot product or other similarity metric) with the input query 404 out of all the questions in the candidate QA pairs 443, and can output the 15 answers that are associated with the top 15 questions as the top k candidate answers 451 (in which case k=15). In some implementations, the question answer retrieval operation 450 can be performed by the answer retriever engine 320. In some cases, the question answer retrieval operation 450 can use Google USE or other suitable technique for retrieving the questions and answers from the candidate QA pairs 443.

The aggregated question answer retrieval operation 452 compares the input query 404 to the candidate {Q}A pairs 445, and outputs a candidate answer 3 453. In some implementations, the question answer retrieval operation 450 can be performed by the answer retriever engine 320. In some cases, the aggregated question answer retrieval operation 452 can use BM25, a Bayesian model, Google USE or other suitable technique for retrieving the candidate answer 3 453 from the {Q}A pairs 445.

An answer selection operation 454 can then be performed to compare the candidate answer 1 449 to the top k candidate answers 451. For instance, the answer selection operation 454 can determine whether the candidate answer 1 449 is in the answer set {Answer 2} defined by the top k candidate answers 451. In one example, the answer selection operation 454 can compare an entity ID assigned to the candidate answer 1 449 with the entity ID assigned to each answer in the answer set {Answer 2}, and if the entity ID assigned to the candidate answer 1 449 matches an entity ID of one of the answers in the answer set {Answer 2}, it can be determined that the candidate answer 1 449 is in the answer set {Answer 2} defined by the top k candidate answers 451. If the answer selection operation 454 determines that the candidate answer 1 449 is in the answer set {Answer 2}, the online sub-process 420 can output the candidate answer 1 at operation 456 as the final output answer for the input query 404. If the answer selection operation 454 determines that the candidate answer 1 449 is not in the answer set {Answer 2}, the online sub-process 420 can output the candidate answer 3 at operation 458 as the final output answer for the input query 404. Accordingly, if the retriever-reader process performed by the passage retrieval operation 446 and the answer prediction operation 448 is not performing well, as indicated by the candidate answer 1 449 not being consistent with the answer set {Answer 2} results from the QA space (including the candidate QA pairs 443), the online sub-process 420 determines to answer the question defined by the query 404 using the candidate answer 3 453 determined from the {Q}A space. One reason why candidate answer 3 453 can be considered more accurate that a candidate answer from the QA space (including the candidate QA pairs 443) is due to the entity normalization and linking performed by the aggregation operation 444, which can result in more accurate candidate answers.

An illustrative example is now provided showing an application of the question answering system 300 using the process 400 shown in FIG. 4. This example uses the following golden truth QA pair from the TriviaQA dataset:

Question—"Who won Super Bowl XX?"

Answer—"chicago bears"

For this question, the TriviaQA dataset provides seven documents that are likely to contain the answer, and below are example paragraphs from those documents that may be used to extract the answer:

Paragraph 1. Super Bowl XX one of the first Super Bowls I remember watching as a kid, brings back the fond memories of the Bears crushing defense. With the Chicago Bears being the clear favorite over the New England Patriots it came as no surprise this turned out as a 46-10 blowout.

Paragraph 2. The National Football Conference (NFC) champion Chicago Bears (18-1) defeated the American Football Conference (AFC) champion New England Patriots (14-6), 4610. The Bears set Super Bowl records for sacks (7) and fewest rushing yards allowed (7). The Bears' 36-point margin over the Patriots was a Super Bowl record until Super Bowl XXIV .(45) The Patriots were held to negative yardage (−19) throughout the entire first half, and just 123 total yards in the entire game, the second lowest total in Super Bowl history.

Paragraph 3. Super Bowl XX was an American football game between the National Football Conference (NFC) champion Chicago Bears and the American Football Conference (AFC) champion New England Patriots to decide the National Football League (NFL) champion for the 1985 season. The Bears defeated the Patriots by the score of 4610, capturing their first NFL championship since 1963, three years prior to the birth of the Super Bowl. Super Bowl XX was played on Jan. 26, 1986 at the Louisiana Superdome in New Orleans, La.

Paragraph 4. The Chicago Bears devastated the New England Patriots on this date in Super Bowl XX by an appropriate score, 46-10, stamping their ravaging "46" defense on National Football League history. The victory in New Orleans' Superdome, the first major championship for a Chicago team since the 1963 NFL title, was a near-perfect ending to a near perfect season.

Paragraph 5. The NFC champion Chicago Bears, seeking their first NFL title since 1963, scored a Super Bowl-record 46 points in downing AFC champion New England 46-10 in Super Bowl XX. The previous record for most points in a Super Bowl was 38, shared by San Francisco in XIX and the Los Angeles Raiders in XVIII.

From the sentences in the dataset, the corpus reader engine 316 can perform NER to detect named entities and link the named entities to one or more electronic documents (e.g., one or more web pages, such as Wikipedia pages using TAGME). Using Paragraph 1 from above as an illustrative example, below are named entities (shown in [brackets]) from Paragraph 1:

Paragraph 1 with detected entities in [brackets]: [Super Bowl XX] one of the first Super Bowls I remember watching as a kid, brings back the fond memories of the Bears crushing defense. With the [Chicago Bears]

being the clear favorite over the [New England Patriots] it came as no surprise this turned out as a 46-10 blowout.

It is noted that there can be other instances of detected named entities from the paragraph above and that there are other instances of detected named entities from Paragraphs 2-5 above. The three named entities shown in brackets in the paragraph above include the three named entities with the highest score determined by the corpus reader engine 316 (e.g., using TAGME). Other named entities can be detected by lowering a score threshold that can be used to detect named entities. Each detected named entity is considered a candidate answer in the QA space, as noted above. The corpus reader engine 316 can apply the question generator to read the other words in the Paragraph 1 above (words other than the named entities) to obtain the context of the paragraph. For a given named entity (and thus a given candidate answer), using the context provided by the other words other than the named entity, the question generator can generate a question whose answer is that entity. For instance, the words that are in proximity to the named entity (e.g., within a certain number of words of the named entity, such as within two words, within three words, within five words, within the same sentence, or other number of words) can be used to generate the question. Below are examples showing the generated questions for the three detected entities in Paragraph 1, as well as the generated questions for the detected "chicago bears" entity in the other four paragraphs:

Paragraphs with candidate answers underlined and the generated question followed:

Paragraph 1 (named entity: Super Bowl XX). [Super Bowl XX] one of the first Super Bowls I remember watching as a kid, brings back the fond memories of the Bears crushing defense. With the Chicago Bears being the clear favorite over the New England Patriots it came as no surprise this turned out as a 46-10 blowout.
Question: who was one of the first super bowls I remember watching?
Paragraph 1 (named entity: Chicago Bears). Super Bowl XX one of the first Super Bowls I remember watching as a kid, brings back the fond memories of the Bears crushing defense. With the [Chicago Bears] being the clear favorite over the New England Patriots it came as no surprise this turned out as a 46-10 blowout.
Question: what was the clear favorite over the new england patriots?
Paragraph 1 (named entity: New England Patriots). Super Bowl XX one of the first Super Bowls I remember watching as a kid, brings back the fond memories of the Bears crushing defense. With the Chicago Bears being the clear favorite over the New [England Patriots] it came as no surprise this turned out as a 46-10 blowout.
Question: how did the chicago bears turn out as a 46-10 blowout?
Paragraph 4 (named entity: Chicago Bears). The National Football Conference (NFC) champion [Chicago Bears] (18-1) defeated the American Football Conference (AFC) champion New England Patriots (14-6), 4610. The Bears set Super Bowl records for sacks (7) and fewest rushing yards allowed (7). The Bears' 36-point margin over the Patriots was a Super Bowl record until Super Bowl XXIV .(45) The Patriots were held to negative yardage (−19) throughout the entire first half, and just 123 total yards in the entire game, the second lowest total in Super Bowl history.
Question: what does 18-1 stand for?
Paragraph 5 (named entity: Chicago Bears). Super Bowl XX was an American football game between the National Football Conference (NFC) champion [Chicago Bears] and the American Football Conference (AFC) champion New England Patriots to decide the National Football League (NFL) champion for the 1985 season. The Bears defeated the Patriots by the score of 4610, capturing their first NFL championship since 1963, three years prior to the birth of the Super Bowl. Super Bowl XX was played on Jan. 26, 1986 at the Louisiana Superdome in New Orleans, La.
Question: super bowl xx was an American football game between the national football conference (nfc) champion?
Paragraph 6 (named entity: Chicago Bears). The [Chicago Bears] devastated the New England Patriots on this date in Super Bowl XX by an appropriate score, 46-10, stamping their ravaging "46" defense on National Football League history. The victory in New Orleans' Superdome, the first major championship for a Chicago team since the 1963 NFL title, was a near-perfect ending to a near perfect season.
Question: who devastated the new England patriots with an appropriate score?
Paragraph 7 (named entity: Chicago Bears). The NFC champion [Chicago Bears], seeking their first NFL title since 1963, scored a Super Bowl-record 46 points in downing AFC champion New England 46-10 in Super Bowl XX. The previous record for most points in a Super Bowl was 38, shared by San Francisco in XIX and the Los Angeles Raiders in XVIII.
Question: what was the name of the NFC champion?

The generated questions, together with the corresponding candidate answers, form the question and answer pairs of the QA space. From the above examples, it can be seen that the question generation algorithm converts the context of the paragraphs into the questions. In some cases, due to the questions being machine generated based on the question generation, the wording of a question is incorrect or confusing. For example, the question "who was one of the first super bowls I remember watching?" should be written as "what was one of the first super bowls I remember watching?" In some other cases, the question can be answered with the context, but is a meaningless question if asked without the context. For example, the question "what does 18-1 stand for?" can be answered with the given paragraph, but if the context is not given, the meaning of the question is unknown. In some cases, the question may not be readable, such as "super bowl xx was an American football game between the national football conference (nfc) champion." There can also be cases where the pairing between the generated question and the candidate answer is wrong. In the retrieval process described below, such questions will likely not be selected and more relevant and accurate questions may be retrieved.

From the examples of the questions generated from the answer "Chicago Bears", it can be seen that some of the questions are similar to or have parts of the golden truth question "who won Super Bowl XX?" The aggregator engine 317 can be used to combine pieces of information from multiple generated questions, which can lead to the golden truth question more likely being better captured in the generated questions. For example, the aggregator engine 317 can combine the generated questions whose answer is "Chicago Bears" or whose answer is a synonyms of the "Chicago Bears" (e.g., Chicago Staleys, Chicago Bears football, The Bears, etc.) into a question set {Q}, and the answer corresponding to the question set {Q} is a normalized answer "Chicago Bears" (assigned to an entity ID) that represents all its synonyms. In one illustrative example, the aggregation performed by the aggregator engine 317 generates the following question set for the normalized answer "Chicago Bears":

"in the first half, how many times did the first half take place?
"what was the lead 30-3?"
"along with mcmahon, perry, perry, perry and linebacker mike singletary were among who?"
"who called the wrong play?"
"in the first half how many times did the last half?"
"what type of touchdown did mcmahon start to increase?"
"what is the name of the type of defensive?"
"what was the name of payton's leading rusher?"
"along with 1 fumble, what was the name of the first super bowl?"
"who finished the game with 129 receiving yards?"
"what was the name of the NFC champion?"
"what was the name of england's first drive called?"
"what was the name of the company that drove a 24-yard reception?"
"what is the patriots' main strength on offense?"
"whose defense dominated new england for the rest of the game?"
"what was the clear favorite over the new England patriots?"
"who played a lesser role for the greater good by showing his unselfishness?"
"what defense was most of all this super bowl?"
"what was the name of the two plays later?"
"the first drive of the second half ended with a punt to whose 4-yard line?"
"what position did ditka hold?"
"who was named the game's most valuable player?"
"what became national stars?"
"how many quarterback mcmahon make up the league's dress code?"
"what does 18-1 stand for?"
"what set super bowl records for sacks?"
"what set over the patriots was a super bowl record?"
"what is the most valuable player of super bowl xx?"
"what was the name of the second wild-card team?"
"super bowl xx was an american football game between the national football conference (nfc) champion?"
"who defeated the patriots?"
"what was the name of the two plays later?"
"who had the ball on the patriots' two yard line?"
"who finished the game with 129 receiving yards?"
"what was the name of eisenhower's first drive?"
"what type of 46 zone?"
"what was payton's leading rusher during the game?"
"who devastated the new england patriots with an appropriate score?"
"how many quarterback mcmahon mcmahon mcmahon?"

The above example questions form the question set {Q} for one {Q}A pair in the {Q}A space. As noted above, the {Q}A Space can contain all pairs for all normalized answers (normalized named entities). The example question set {Q} from above is noisy, with several inaccurate questions, while the pieces of information needed to link the golden truth answer "Chicago Bears" to the golden truth question "who won Super Bowl XX?" are scattered throughout the {Q}A pair for the normalized "Chicago Bears" answer/named entity.

Using the golden truth question "who won Super Bowl XX?" as input to process 400 of FIG. 4 (e.g., performed by the question answering system 300) as the input query 404, the passage retrieval operation 446 (e.g., using Google USE) retrieves from all passages in the corpus of text the following as the passage most semantically similar to the input query 404:

"Super Bowl XIII (1979)—The Steelers and the Cowboys met for a Super Bowl rematch in 1979, and this game ended the same way as the one three years earlier—with a Pittsburgh victory. This time, however, it was Steelers quarterback Terry Bradshaw who won MVP, throwing for 318 yards and four touchdowns as Pittsburgh edged Dallas 35-31."

The answer prediction operation 448 (e.g. using the BERT model) of the online sub-process 420 extracts the answer "Terry Bradshaw" (as candidate Answer 1) from the retrieved passage shown above. As can be seen, the predicted answer is incorrect, which illustrates the limits of a retriever-reader system. For example, because the retrieved passage does not contain the correct answer, it is impossible for the reader based answer prediction operation 448 to extract the correct answer from the passage. Without knowing the golden truth answer, the question answering system 300 can use {Answer 2} (e.g., defined by the top k candidate answers 451) to decide whether to accept this predicted answer.

For example, the question answer retrieval operation 450 of the online sub-process 420 (e.g., using Google USE) retrieves the top 10 questions from the QA Space that are most semantically similar to the input query "who won Super Bowl XX?". The results are listed in numerical order below with the format of: "Generated question? answer entity mention; normalized answer entity":

1. who lost the first super bowl? chiefs; kansas city chiefs
2. who lost the first super bowl? kansas city chiefs; kansas city chiefs
3. who won their second straight super bowl? dallas; dallas cowboys
4. who became the first super bowl? eason; tony eason
5. who became the first super bowl? eason; tony eason
6. what was the result of the last super bowl win? tight end; tight end
7. who was most of all this super bowl? coach; coach (sport)
8. what was the name of the lead to win their second straight super bowl? steelers; pittsburgh steelers
9. who won the dolphins' 14-7? washington; washington huskies football
10. who shared the record for most points in a super bowl? los angeles raiders; history of the los angeles raiders Note that one QA pair is repeated in the top ten results, which is because the entity "tony eason" appears at least twice in the corpus and by coincidence the two questions generated from two such instances are the same. The answer selection operation 454 of the online sub-process 420 can determine whether to accept the candidate Answer 1 ("Terry Bradshaw") as the answer to the input query based on whether the candidate Answer 1 appears in the set of ten answers associated to the top 10 similar questions. In this example, the answer selection operation 454 will reject the candidate Answer 1 ("Terry Bradshaw") because it is not in the set of {Answer 2}. The question answering system 300 can predict a candidate Answer 3 from the {Q}A Space, and use the Answer 3 as the output answer for the input query. As noted above, if instead Answer 1 is in {Answer 2}, the question answering system 300 can accept Answer 1 and return it as the output answer for the input query.

As described above, the aggregated question answer retrieval operation 452 can determine a candidate answer 3 453 by searching for the set of questions in the {Q}A Space that is most similar to the input query 404. In one illustrative example, the BM25 ranking function can be used to rank the question set {Q} given above for the normalized answer "Chicago Bears" as the highest among all question sets in the {Q}A space, and therefore the associated answer "Chicago Bears" is returned as the predicted output answer for the input query "who won Super Bowl XX?".

Figure 5:
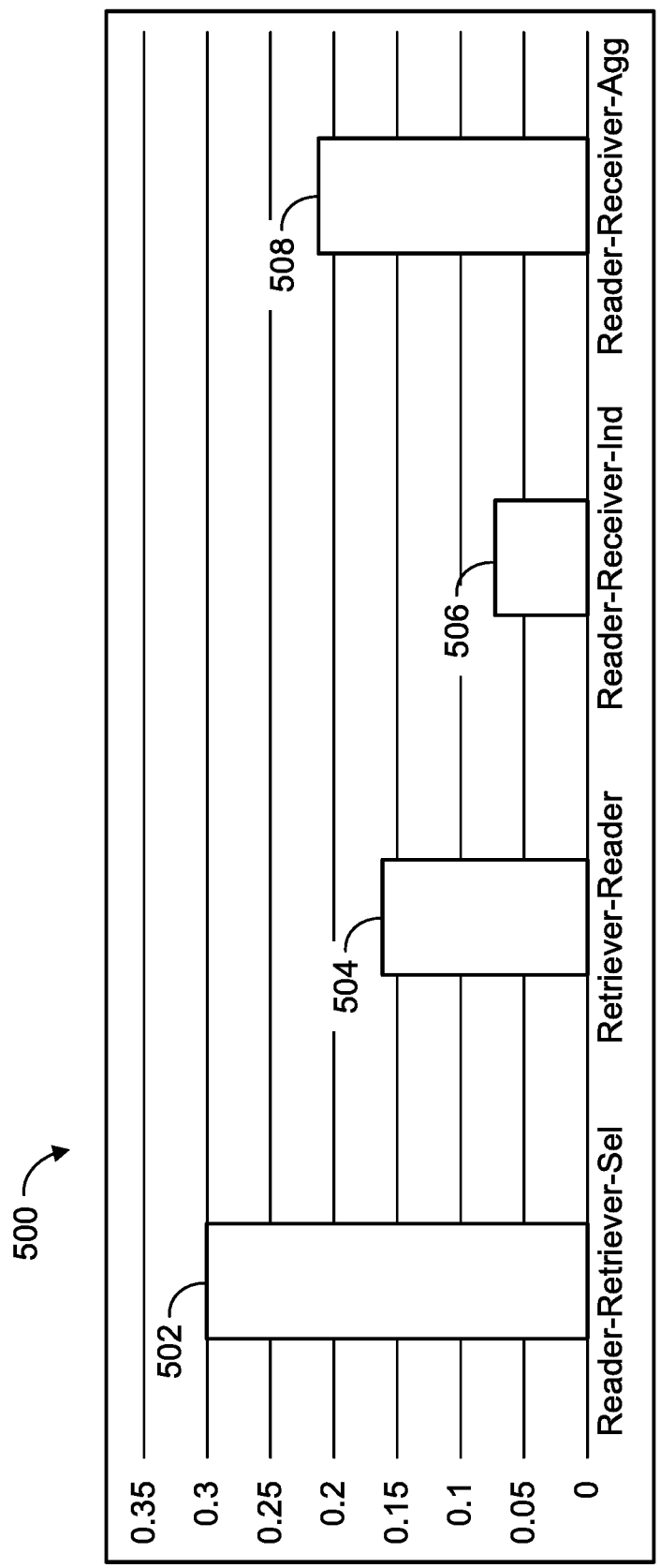
FIG. 5 is a chart illustrating an example of accuracy results using different question answering approaches, in accordance with some examples provided herein.

FIG. 5 is a graph 500 illustrating results of different question answering techniques on an Open-domain Question Answering (OpenQA) dataset. The results shown in the graph 500 are based on an evaluation of the accuracy of four different question answering techniques on a 100-question subset of the public TriviaQA dataset. The four evaluated techniques include the reader-retriever approach described above with respect to FIG. 3 (denoted in the graph 500 as "reader-retriever-sel"), a baseline retriever-reader (denoted in the graph 500 as "retriever-reader"), and two components of the reader-retriever approach described above with respect to FIG. 3, including using an answer retrieved from the QA space (denoted in the graph 500 as "reader-retriever-ind") and using an answer retrieved from the {Q}A space (denoted in the graph 500 as "reader-retriever-agg"). The baseline retriever-reader can perform the passage retrieval operation 446 and the answer prediction operation 448 (e.g., to generate answer 1 449) described above.

The result 504 show that the baseline retriever-reader approach achieves an accuracy of 17%, indicating that the baseline retriever-reader approach determines an accurate answer only 17% of the time when performed on an OpenQA dataset. The result 502 show that the reader-retriever-agg component (using the {Q}A space) reaches 21% accuracy and that the reader-retriever-sel approach based on the complete model reaches 30% accuracy. Although the reader-retriever-ind component itself results in an accuracy of 7%, as shown by the result 506, the role of the reader-retriever-ind component in deciding whether to accept or reject the baseline result from the baseline reader-retriever approach is beneficial, as indicated by the large increase in accuracy shown by the result 502 as compared to the result 504 of the baseline retriever-reader approach.

Figure 6:
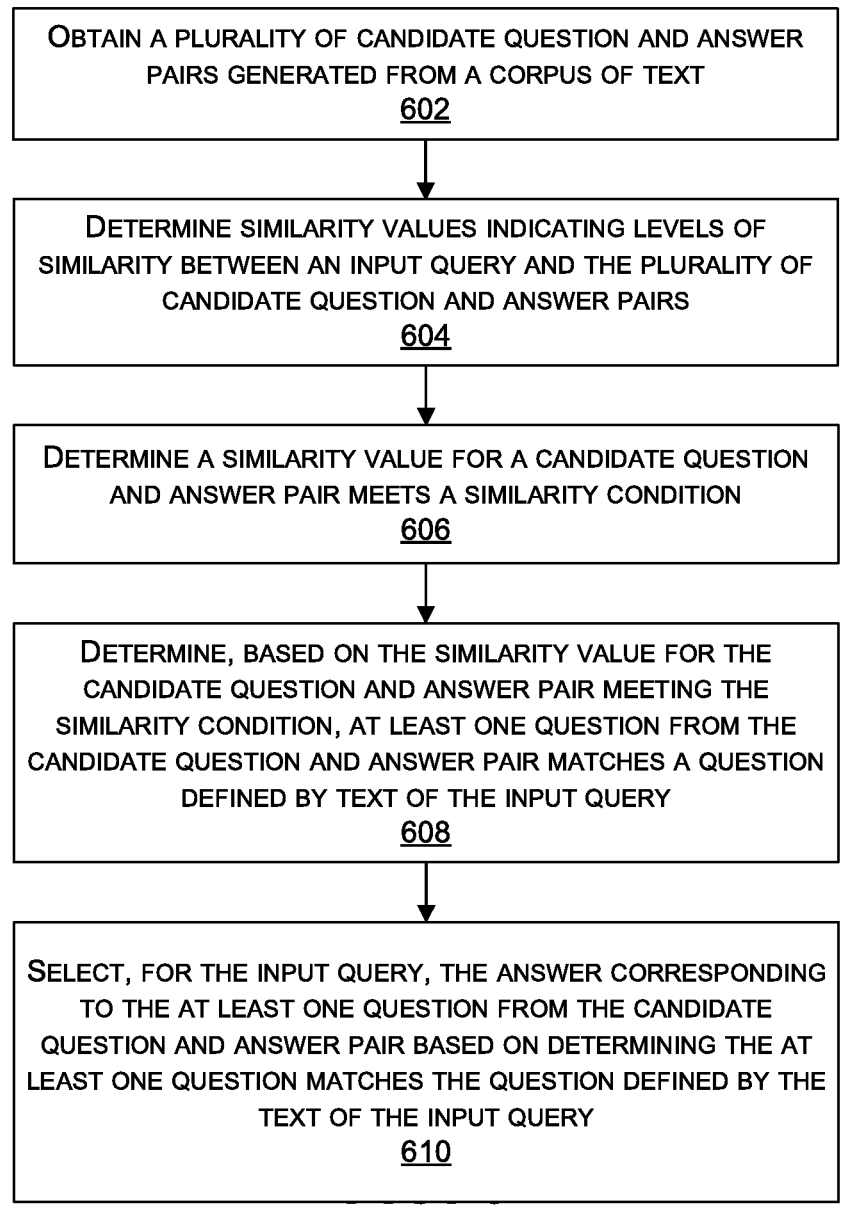
FIG. 6 is a flowchart illustrating an example of a process of generating one or more answers for one or more queries, in accordance with some examples provided herein.

An example of a process performed using the techniques described herein will now be described. FIG. 6 is a flowchart illustrating an example of a process 600 for generating one or more answers for one or more queries. At block 602, the process 600 includes obtaining a plurality of candidate question and answer pairs. The plurality of candidate question and answer pairs can be generated from a corpus of text. A candidate question and answer pair from the plurality of candidate question and answer pairs includes at least one question and an answer corresponding to the at least one question. In some cases, the at least one question of the candidate question and answer pair includes a single question, in which case the answer corresponds to the single question. For instance, as described above, a QA space can be generated that includes a question associated with an answer. In some cases, the at least one question of the candidate question and answer pair includes a set of questions, in which case the answer corresponds to the set of questions. For instance, as described above, a {Q}A space can be generated that includes multiple questions that are associated with a same answer (e.g., a common entity ID).

In some cases, the plurality of question and answer pairs can include the QA space and the {Q}A space described above.

In some cases, the process 600 can include receiving an input query including text defining a question. In some examples, the input query can be received by an input device, such as an input of a client device (e.g., a touchscreen input from a mobile device, a keyboard input from a mobile device or computer, a gesture input, a voice input, and/or any other input). In one illustrative example, a user can type a question into a search function of a software program, and the input query can be generated based on the question.

At block 604, the process 600 includes determining similarity values indicating levels of similarity between the input query and the plurality of candidate question and answer pairs. The similarity values can be determined by comparing the text of the input query to text of the plurality of candidate question and answer pairs. In some examples, the process 600 can include generating a vector representation of the text of the input query, and generating vector representations of text of questions included in the plurality of candidate question and answer pairs. In such examples, comparing the text of the input query to the text of the plurality of candidate question and answer pairs can include determining a semantic similarity between the question defined by the text of the input query and questions included in the plurality of candidate question and answer pairs. The semantic similarity can be determined by comparing the vector representation of the text of the input query to the vector representations of the text of the questions included in the plurality of candidate question and answer pairs. For instance, as described above, the process 600 can compute a dot product (or cosine similarity) between the vector representation of the text of the input query and each of the vector representations of the text of the questions included in the plurality of candidate question and answer pairs to determine the semantic similarity. The dot product computed between the vector representation of the text of the input query and a vector representation of the text of a question from a candidate question and answer pair can result in a similarity value for the candidate question and answer pair that includes that question.

At block 606, the process 600 includes determining a similarity value for a candidate question and answer pair from the plurality of candidate question and answer pairs meets a similarity condition. In some cases, the similarity condition indicates the similarity value for the candidate question and answer pair is to be a highest similarity value among the determined similarity values. In some cases, the similarity condition indicates the similarity value for the candidate question and answer pair is to be within a threshold number of highest similarity values among the determined similarity values.

At block 608, the process 600 includes determining, based on the similarity value for the candidate question and answer pair meeting the similarity condition, at least one question from the candidate question and answer pair matches the question defined by the text of the input query. At block 610, the process 600 includes selecting, for the input query, the answer corresponding to the at least one question from the candidate question and answer pair. The answer is selected for the input query based on determining the at least one question matches the question defined by the text of the input query. For example, the entity ID of an answer that is associated with the at least one question can be selected. In one illustrative example, a question answer retrieval operation (e.g., question answer retrieval operation 450) and/or an aggregated question answer retrieval operation (e.g., aggregated question answer retrieval operation 452) can be performed using the techniques described herein to compare the input query to the plurality of candidate question and answer pairs, determine the at least one question, and select the answer corresponding to the at least one question. In some cases, multiple answers (e.g., the top k candidate answers) can be selected, as described above.

In some examples, the process 600 can include obtaining the corpus of text and determining a portion of the corpus of text corresponding to the input query. For instance, in some cases, the process 600 can include comparing the text of the input query to a plurality of portions of the corpus of text, and determining the portion of the corpus of text from the plurality of portions based on comparing the text of the input query to the plurality of portions of the corpus of text. The process 600 can further include determining a candidate answer from the portion of the corpus of text and determining that the candidate answer matches the answer selected for the input query. The process 600 can include selecting the candidate answer as an output answer for the input query based on determining the candidate answer matches the answer selected for the input query.

In some examples, the process 600 can include selecting, for the input query, a plurality of answers from the plurality of candidate question and answer pairs. In such examples, determining the candidate answer matches the answer selected for the input query includes determining the candidate answer matches at least one answer from the plurality of answers selected for the input query. For instance, referring to FIG. 4 as an illustrative example, the top k candidate answers 451 from the candidate QA pairs 443 can be compared with the candidate answer 1 449 determined by processing the corpus of text 402 using the passage retrieval operation 446 and the answer prediction operation 448. If the candidate answer 1 449 matches one of the answers in the top k candidate answers 451, the candidate answer 1 449 can be output as the output answer.

As noted above, in some examples, the at least one question of the candidate question and answer pair includes a set of questions, in which case the answer corresponds to the set of questions. In such examples, the process 600 can include determining a first candidate answer associated with the set of questions. The process 600 can include obtaining the corpus of text and determining a portion of the corpus of text corresponding to the input query. For instance, in some cases, the process 600 can include comparing the input query to a plurality of portions of the corpus of text, and determining the portion of the corpus of text from the plurality of portions based on comparing the input query to the plurality of portions of the corpus of text. The process 600 can include determining a second candidate answer from the portion of the corpus of text, and determining that the second candidate answer does not match the answer selected for the input query. The process 600 can include selecting the first candidate answer as an output answer for the input query based on determining the second candidate answer does not match the answer selected for the input query. In some examples, the process 600 can include selecting, for the input query, a plurality of answers from the plurality of candidate question and answer pairs. In such examples, determining the second candidate answer does not match the answer selected for the input query includes determining the second candidate answer does not match any answer from the plurality of answers selected for the input query. For instance, referring to FIG. 4 as an illustrative example, if the candidate answer 1 449 does not match one of the answers in the top k candidate answers 451, the candidate answer 3 453 can be output as the output answer.

Figure 8:
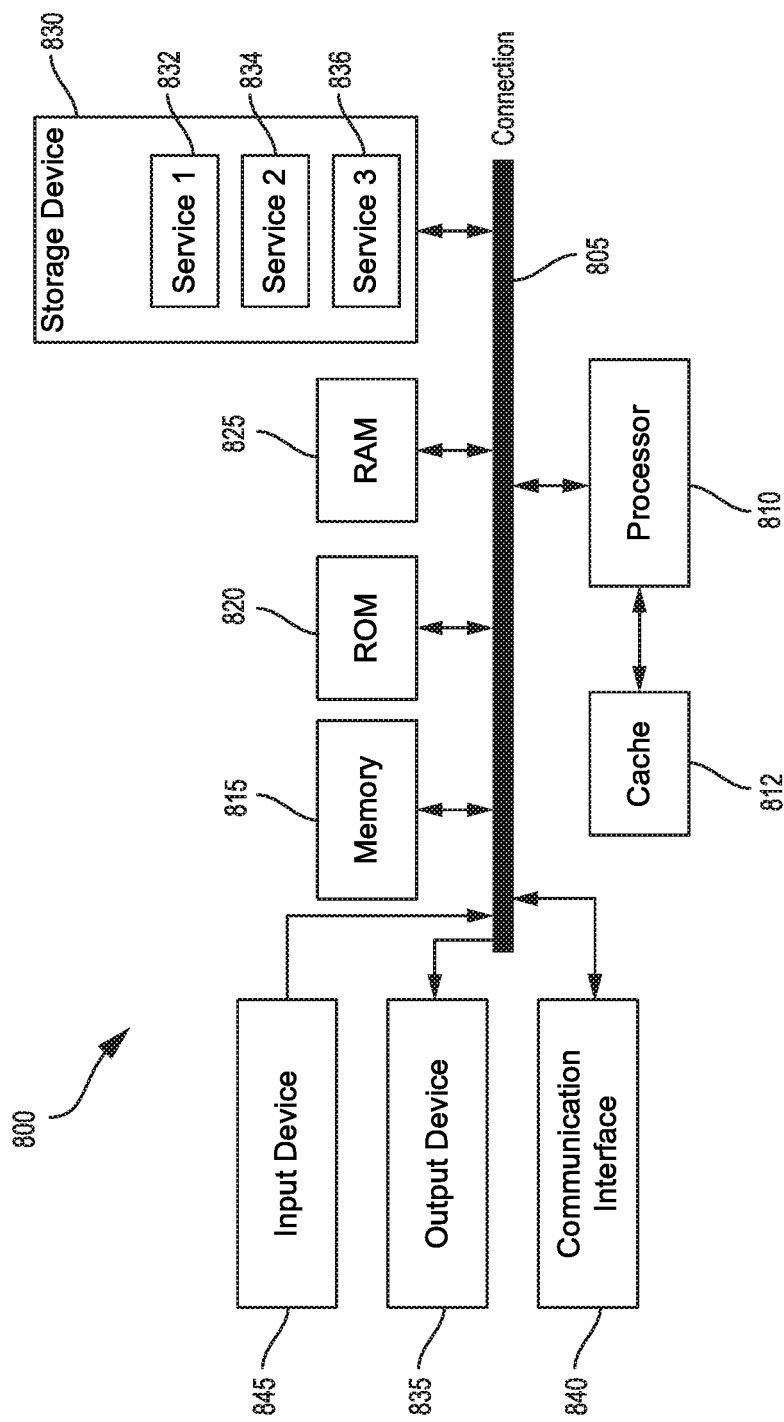
FIG. 8 is an example computing device architecture of an example computing device that can implement the various techniques described herein.

In some examples, the processes described herein (e.g., process 400, process 600, or other process described herein) may be performed by a computing device or apparatus, such as a computing device having the computing device architecture 800 shown in FIG. 8. In one example, the process 600 can be performed by a computing device with the computing device architecture 800 implementing the question answering system 300. The computing device can include any suitable device, such as a mobile device (e.g., a mobile phone), a desktop computing device, a tablet computing device, a wearable device, a server (e.g., in a software as a service (SaaS) system or other server-based system), and/or any other computing device with the resource capabilities to perform the processes described herein, including processes 400 and 600. In some cases, the computing device or apparatus may include various components, such as one or more input devices, one or more output devices, one or more processors, one or more microprocessors, one or more microcomputers, and/or other component that is configured to carry out the steps of processes described herein. In some examples, the computing device may include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 400 and process 600 are illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 7:
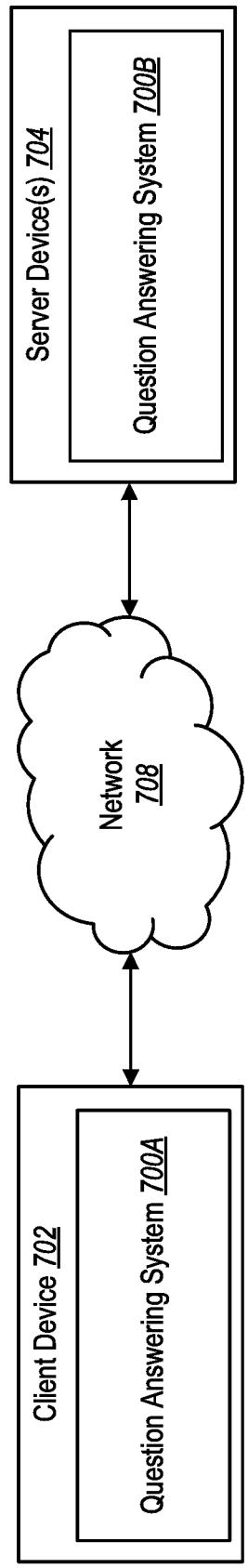
FIG. 7 is a diagram illustrating an example of an environment in which the question answering system can be implemented, in accordance with some examples provided herein.

FIG. 7 illustrates a schematic diagram of an environment 700 in which the question answering system 300 can be implemented in accordance with one or more examples. In some examples, the environment 700 includes various computing devices including a client device 702 and one or more server devices 704. The environment 700 also includes a network 708. The network 708 may be any suitable network over which the computing devices can communicate, including any wired or wireless network.

As illustrated in FIG. 7, the environment 700 includes the client device 702. The client device 702 may comprise any computing device, such as the computing device described below in relation to FIG. 8. As shown, the client device includes the question answering system 700A, which are described previously. For example, as described above, the question answering system 700A can generate candidate question and answer pairs (which can include aggregated candidate question and answer pairs in some cases), and can use the candidate question and answer pairs to answer a question defined by an input query. The question answering system 700A can in some cases combine a retriever-reader approach with a reader-retriever approach to answer an input query.

In addition, the environment 700 includes the one or more server devices 704, which may comprise any computing device, such as one or more of the computing devices described below in relation to FIG. 8. The one or more server devices 704 can generate, store, receive, and transmit any type of data, including a corpus of text, question and answer pairs, input queries, any combination thereof, among other data. As shown, the one or more server devices 704 can include a question answering system 700B that can communicate with the question answering system 700A on the client device 702. For example, the question answering system 700B can transmit user queries, corpus information (e.g., online documents, web pages, etc.), and/or other information to the client device 702, which enables the client device 702 to process user queries using the question answering system 700A. While only a single server device is shown, the one or more servers devices 704 can be implemented across multiple server devices.

While not illustrated, in one or more embodiments, the client device and/or the one or more server devices 704 can also include all components, or a portion of the components, of the question answering system 300. For example, when located in the one or more server devices 704, the question answering system 700B can comprise an application running on the one or more server devices 704 or a portion of a software application that can be downloaded to the client device 702. For instance, question answering system 700B can include a web hosting application allowing the client device 702 to interact with content from the question answering system 700B hosted on the one or more server devices 704. In this manner, the one or more server devices 704 can process user queries based on user interaction within a graphical user interface provided to the client device 702.

Although FIG. 7 illustrates a particular arrangement of the one or more server devices 704, the client device 702, and the network 708, various additional arrangements are possible. For example, while FIG. 7 illustrates the one or more client device 702 communicating with the one or more server devices 704 via the network 708, in one or more embodiments a single client device may communicate directly with the one or more server devices 704, bypassing the network 708.

Similarly, although the environment 700 of FIG. 7 is depicted as having various components, the environment 700 may have additional or alternative components. For example, the question answering system 700A and/or the question answering system 700B can be implemented on multiple computing devices. For instance, the question answering system 300 may be implemented in whole by the one or more server devices 704 or the question answering system 300 may be implemented in whole by the client device 702. Alternatively, the question answering system 300 may be implemented across multiple devices or components (e.g., utilizing the one or more server devices 704 and the one or more client device 702).

FIG. 8 illustrates an example computing device architecture 800 of an example computing device which can implement the various techniques described herein. For example, the computing device architecture 800 can implement the question answering system 300 shown in FIG. 3. The components of computing device architecture 800 are shown in electrical communication with each other using connection 805, such as a bus. The example computing device architecture 800 includes a processing unit (CPU or processor) 810 and computing device connection 805 that couples various computing device components including computing device memory 815, such as read only memory (ROM) 820 and random access memory (RAM) 825, to processor 810.

Computing device architecture 800 can include a cache of high-speed memory connected directly with, in close proximity to, or integrated as part of processor 810. Computing device architecture 800 can copy data from memory 815 and/or the storage device 830 to cache 812 for quick access by processor 810. In this way, the cache can provide a performance boost that avoids processor 810 delays while waiting for data. These and other modules can control or be configured to control processor 810 to perform various actions. Other computing device memory 815 may be available for use as well. Memory 815 can include multiple different types of memory with different performance characteristics. Processor 810 can include any general purpose processor and a hardware or software service, such as service 1 832, service 2 834, and service 3 836 stored in storage device 830, configured to control processor 810 as well as a special-purpose processor where software instructions are incorporated into the processor design. Processor 810 may be a self-contained system, containing multiple cores or processors, a bus, memory controller, cache, etc. A multi-core processor may be symmetric or asymmetric.

To enable user interaction with the computing device architecture 800, input device 845 can represent any number of input mechanisms, such as a microphone for speech, a touch-sensitive screen for gesture or graphical input, keyboard, mouse, motion input, speech and so forth. Output device 835 can also be one or more of a number of output mechanisms known to those of skill in the art, such as a display, projector, television, speaker device, etc. In some instances, multimodal computing devices can enable a user to provide multiple types of input to communicate with computing device architecture 800. Communication interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. Storage device 830 can include services 832, 834, 836 for controlling processor 810. Other hardware or software modules are contemplated. Storage device 830 can be connected to the computing device connection 805. In one aspect, a hardware module that performs a particular function can include the software component stored in a computer-readable medium in connection with the necessary hardware components, such as processor 810, connection 805, output device 835, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of generating one or more answers for one or more queries, comprising:
    generating, using deep neural networks trained to analyze text and generate answers for one or more question and answer spaces, a first set of question and answer pairs from a corpus of text;
    receiving an input query;
    determining, using similarity values between questions from the first set of question and answer pairs and a question defined by text of the input query, a second set of question and answer pairs, wherein the second set of question and answer pairs includes at least one question from the first set of question and answer pairs that matches the input query;
    generating, by an encoder-decoder neural network model, a predicted answer to the input query from the corpus of text; and
    determining an output answer to the input query, wherein the determining includes:
        selecting the predicted answer as the output answer when the predicted answer is in the second set of question and answer pairs, and
        selecting an answer corresponding to the second set of question and answer pairs as the output answer when the predicted answer is not in the second set of question and answer pairs.

2. The method of claim 1, further comprising:
    obtaining the corpus of text;
    determining a portion of the corpus of text corresponding to the input query;
    determining, using named entity recognition, a candidate answer from the portion of the corpus of text; and
    determining the candidate answer matches the predicted answer for the input query.

3. The method of claim 2, further comprising:
comparing the text of the input query to a plurality of portions of the corpus of text; and
determining the portion of the corpus of text from the plurality of portions based on comparing the text of the input query to the plurality of portions of the corpus of text.

4. The method of claim 1, further comprising:
generating a vector representation of the text of the input query;
generating vector representations of text of questions included in the first set of question and answer pairs; and
comparing the text of the input query to the text of the first set of question and answer pairs includes determining a semantic similarity between the question defined by the text of the input query and questions included in the first set of question and answer pairs, the semantic similarity being determined by comparing the vector representation of the text of the input query to the vector representations of the text of the questions included in the plurality first set of question and answer pairs.

5. The method of claim 1, wherein determining, using the similarity values between questions from the first set of question and answer pairs and the question defined by the text of the input query, the second set of question and answer pairs further comprises:
determining that a similarity value for at least one question from the first set of question and answer pairs satisfies a similarity condition.

6. The method of claim 5, wherein the similarity condition indicates the similarity value for a candidate question and answer pair is to be within a threshold number of highest similarity values among the determined similarity values.

7. A system for generating one or more answers for one or more queries, comprising:
one or more processors; and
memory accessible to the one or more processors, the memory storing instructions, which upon execution by the one or more processors, cause the one or more processors to perform operations comprising:
determining candidate answers from a corpus of text based on classifications of text in the corpus of text;
determining candidate questions from portions of the corpus of text that include the candidate answers;
generating, using deep neural networks trained to analyze text and generate answers for one or more question and answer spaces, a first set of candidate question and answer pairs including the candidate answers and the candidate questions;
receiving an input query;
determining, using similarity values between questions from the first set of question and answer pairs and a question defined by text of the input query, a second set of question and answer pairs, wherein the second set of question and answer pairs includes at least one question from the first set of question and answer pairs that match the input query;
generating, by an encoder-decoder neural network model, a predicted answer to the input query from the corpus of text; and
determining an output answer to the input query, wherein the determining includes:
selecting the predicted answer as the output answer when the predicted answer is in the second set of question and answer pairs, and
selecting an answer corresponding to the second set of question and answer pairs as the output answer when the predicted answer is not in the second set of question and answer pairs.

8. The system of claim 7, the operations further comprising:
determining the similarity values by comparing the text of the input query to text of the first set of question and answer pairs; and
determining the at least one question from the first set of question and answer pairs matches the question defined by the text of the input query based on a similarity value determined for the first set of question and answer pairs meeting a similarity condition.

9. The system of claim 7, the operations further comprising:
comparing the text of the input query to a plurality of portions of the corpus of text;
determining, from the plurality of portions, a portion of the corpus of text corresponding to the input query based on comparing the text of the input query to the plurality of portions of the corpus of text;
determining a candidate answer from the portion of the corpus of text;
determining the candidate answer matches the answer selected for the input query; and
selecting the candidate answer as an output answer for the input query based on determining the candidate answer matches the predicted answer for the input query.

10. The system of claim 9, the memory storing instructions, which upon execution by the one or more processors, cause the one or more processors to the operations further comprising:
selecting, for the input query, a plurality of answers from the first set of question and answer pairs; and
wherein determining the candidate answer matches the answer selected for the input query includes determining the candidate answer matches at least one answer from the plurality of answers selected for the input query.

11. The system of claim 7, the operations further comprising:
generating a vector representation of the text of the input query;
generating vector representations of text of questions included in the first set of question and answer pairs; and
determining a semantic similarity between the question defined by the text of the input query and the questions included in the first set of question and answer pairs, the semantic similarity being determined by comparing the vector representation of the text of the input query to the vector representations of the text of the questions included in the plurality first set of question and answer pairs.

12. A non-transitory computer-readable medium having stored thereon instructions that, when executed by one or more processors, cause the one or more processors to perform operations comprising:
generating, using deep neural networks trained to analyze text and generate answers for one or more question and answer spaces, a first set of question and answer pairs from a corpus of text;
receiving an input query;
determining, using similarity values between questions from the first set of question and answer pairs and a question defined by text of the input query, a second set of question and answer pairs, wherein the second set of question and answer pairs includes at least one question from the first set of question and answer pairs that matches the input query;

generating, by an encoder-decoder neural network model, a predicted answer to the input query from the corpus of text; and determining an output answer to the input query, wherein the determining includes:
- selecting the predicted answer as the output answer when the predicted answer is in the second set of question and answer pairs, and
- selecting an answer corresponding to the second set of question and answer pairs as the output answer when the predicted answer is not in the second set of question and answer pairs.

13. The non-transitory computer-readable medium of claim 12, further comprising:
- obtaining the corpus of text;
- determining a portion of the corpus of text corresponding to the input query;
- determining, using named entity recognition, a candidate answer from the portion of the corpus of text; and
- determining the candidate answer matches the predicted answer for the input query.

14. The non-transitory computer-readable medium of claim 13, further comprising:
- comparing the text of the input query to a plurality of portions of the corpus of text; and
- determining the portion of the corpus of text from the plurality of portions based on comparing the text of the input query to the plurality of portions of the corpus of text.

15. The non-transitory computer-readable medium of claim 13, further comprising:
- generating a vector representation of the text of the input query;
- generating vector representations of text of questions included in the first set of question and answer pairs; and
- comparing the text of the input query to the text of the first set of question and answer pairs includes determining a semantic similarity between the question defined by the text of the input query and questions included in the first set of question and answer pairs, the semantic similarity being determined by comparing the vector representation of the text of the input query to the vector representations of the text of the questions included in the first set of question and answer pairs.

16. The non-transitory computer-readable medium of claim 13, wherein determining, using the similarity values between questions from the first set of question and answer pairs and the question defined by the text of the input query, the second set of question and answer pairs further comprises:
- determining that a similarity value for at least one question from the first set of question and answer pairs satisfies a similarity condition.

17. The non-transitory computer-readable medium of claim 16, wherein the similarity condition indicates the similarity value for a candidate question and answer pair is to be within a threshold number of highest similarity values among the determined similarity values.

\* \* \* \* \*